(12) United States Patent
Zaffke

(10) Patent No.: US 11,155,114 B1
(45) Date of Patent: Oct. 26, 2021

(54) MULTI-PURPOSE STICKER

(71) Applicant: Nathan A. Zaffke, Fargo, ND (US)

(72) Inventor: Nathan A. Zaffke, Fargo, ND (US)

(73) Assignee: Nathan A. Zaffke, Fargo, ND (US)

( * ) Notice: Subject to any disclaimer, the term of this patent is extended or adjusted under 35 U.S.C. 154(b) by 0 days.

(21) Appl. No.: 16/858,412

(22) Filed: Apr. 24, 2020

(51) Int. Cl.
*B44C 1/10* (2006.01)
*G09F 3/10* (2006.01)
*B44C 3/02* (2006.01)
*B32B 7/12* (2006.01)

(52) U.S. Cl.
CPC .......... *B44C 1/105* (2013.01); *G09F 3/10* (2013.01); *B32B 7/12* (2013.01); *B44C 3/02* (2013.01); *C09J 2301/124* (2020.08); *Y10T 428/14* (2015.01)

(58) Field of Classification Search
CPC ........ G09F 3/10; G09F 7/12; G09F 2007/127; Y10T 428/1476; Y10T 428/15; Y10T 428/149; Y10T 428/14; Y10T 428/249992; Y10T 428/1481; Y10T 428/1452; Y10T 428/1471; Y10T 428/249991; Y10T 428/24942; Y10T 428/1495; Y10T 428/1486; Y10T 428/249985; Y10T 428/254; C09J 7/20; A47G 1/17; B44C 1/105; B44C 1/10; B42F 1/00; A45C 11/00; A45C 2011/002; A45C 2011/003; B29L 2031/3437; B29C 63/0013; H04B 1/3888; B32B 29/007; B32B 5/18; B32B 5/02; B32B 27/065; B32B 27/06; B32B 2405/00; B32B 2266/0235; B32B 1/00; B32B 3/266; B32B 7/02; B32B 7/06; B32B 7/12; B32B 9/025; B32B 2250/40; B32B 2307/402; B32B 2307/732; B32B 2307/748; B32B 2307/75; B32B 2439/00; B32B 2451/00; B32B 2571/00
See application file for complete search history.

(56) References Cited

U.S. PATENT DOCUMENTS

| | | | |
|---|---|---|---|
| 3,582,452 A * | 6/1971 | Britton | B44C 1/105 428/209 |
| 3,884,443 A | 5/1975 | McMaster | |
| 4,839,206 A | 6/1989 | Waldenberger | |
| 5,876,817 A * | 3/1999 | Mathna | B42F 1/00 40/391 |
| 6,482,288 B1 * | 11/2002 | Kreckel | A47G 1/17 156/247 |
| 6,503,591 B2 * | 1/2003 | Kuo | G09F 3/10 428/41.9 |
| 6,833,172 B1 | 12/2004 | Schwartz | |
| 9,574,111 B2 | 2/2017 | Niimi | |
| 9,783,704 B2 | 10/2017 | Fujii | |
| 9,867,439 B2 * | 1/2018 | Planche | A45C 11/00 |

(Continued)

*Primary Examiner* — Patricia L. Nordmeyer
(74) *Attorney, Agent, or Firm* — Neustel Law Offices

(57) ABSTRACT

A multi-purpose sticker for decorating and sealing an envelope and also for attaching the sealed envelope to a package, such as a gift. The multi-purpose sticker generally includes a double-sided adhesive layer hidden below a decorative covering. With the decorative cover in place, one side of the double-sided adhesive of the sticker can be used to seal an envelope, and the sticker serves as a decorative sticker. If desired, the decorative cover can be peeled off to expose an adhesive in order to affix the sealed envelope to a package.

4 Claims, 12 Drawing Sheets

(56) References Cited

U.S. PATENT DOCUMENTS

| | | | |
|---|---|---|---|
| 10,092,990 B2 | 10/2018 | Jung | |
| 10,093,835 B2 | 10/2018 | Yamakami | |
| 2002/0066527 A1 | 6/2002 | Lee | |
| 2005/0123705 A1* | 6/2005 | Dronzek, Jr. | B32B 7/06 428/40.1 |
| 2005/0238836 A1* | 10/2005 | Hodsdon | C09J 7/20 428/40.1 |
| 2007/0212509 A1* | 9/2007 | Herbig | G09F 3/10 428/40.1 |
| 2008/0075906 A1* | 3/2008 | Siegal | C09J 7/35 428/41.4 |
| 2011/0014464 A1* | 1/2011 | Tu | B32B 7/12 428/352 |
| 2014/0027500 A1 | 1/2014 | Thorn | |
| 2017/0361638 A1 | 12/2017 | Seth | |

* cited by examiner

MULTI-PURPOSE STICKER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a multi-purpose sticker for appearing as a regular sticker, but with a cover that is removable to reveal an adhesive layer to attach an envelope to a package.

Related Art

Any discussion of the related art throughout the specification should in no way be considered as an admission that such related art is widely known or forms part of common general knowledge in the field.

Decorative stickers are useful for sealing envelopes or as simple decorations, such as enjoyed by children. Such stickers may have colorful, printed designs or embossing on one side and an adhesive on the other, so that they may be used to seal an envelope while also providing decoration, or even useful information or advertising on the printed, visible side.

However, such conventional stickers, as is generally known, only serve those purposes noted above—i.e., sealing envelopes, etc., and providing decoration or presenting information. Thus, stickers having additional purposes, such as attaching envelopes to gifts or packages, while still retaining the characteristics of ordinary stickers, can be more useful and versatile.

SUMMARY

An example embodiment is directed to a multi-purpose sticker. The multi-purpose sticker may generally include a substrate and a releasable or non-releasable (i.e., temporary or permanent) first adhesive layer disposed on a first side of the substrate, a releasable or non-releasable second adhesive layer disposed on a second side of the substrate, and a first release layer in contact with the second adhesive layer. The example embodiment may also include a decorative cover comprising the first release layer and having a first side and a second side, and a first decorative element visible from the second side, the first side releasably covering the second adhesive layer, wherein the decorative cover is about the same size and shape of the substrate, and entirely covers the substrate, and wherein the decorative cover can be selectively removed to expose the second adhesive layer.

The decorative cover may be about the same size and shape as the first release layer. For example, the cover and the first release layer may be die-cut at the same time from two sheets of material, and thus be the same size. Of course, all layers may also be die-cut, laser cut, etc., at the same time to create the same design throughout the sticker. Alternatively, the two materials may be separately formed and then the cover bonded to the first release layer, in which case the two materials may differ slightly in size, although still covering and protecting the adhesive layer of the substrate, which is the general purpose of the first release layer. Die cutting, laser cutting, or any other suitable method may be used to cut the layers of the multi-purpose sticker either individually or simultaneously. The multi-purpose sticker may be cut into any shape and size and is not limited to the designs shown in the drawings included with this application.

In some instances, this example embodiment may further comprise an optional second decorative element on the substrate, wherein the second decorative element is visible when the decorative cover is selectively removed. The optional second decorative element may be placed onto either side of the substrate. The optional second decorative element may be added directly onto the substrate prior to the adhesive layers being applied over the substrate. The second decorative element is optional and may be left off the multi-purpose sticker, allowing for only a transparent double-sided adhesive layer to be seen when the decorative cover is selectively removed.

The example embodiment may further comprise a second release layer positioned to cover the first adhesive layer. In an example embodiment, the second release layer may be larger than the substrate, so that the second release layer may be more easily peeled away from the substrate's first adhesive layer. In some example embodiments, the substrate may be transparent. Further, the decorative cover may comprise an embossed design, a printed design, a stamped design, or any other suitable technique may be used to place a decorative design (i.e., a decorative element) onto the cover. Further, the decorative cover may be made of or comprise film, foil, metal foil, metal, paper, plastic, vinyl, wood, or any other suitable material. This holds true for any embodiment of the multi-purpose sticker using a decorative cover.

In another example embodiment, the multi-purpose sticker may comprise a first substrate, a releasable or non-releasable first adhesive layer disposed on a first side of the first substrate, a releasable or non-releasable second adhesive layer disposed on a second side of the first substrate, and a first release layer in contact with the second adhesive layer. The example embodiment may also include a decorative cover comprising the first release layer and having a first side and a second side, and a first decorative element visible from the second side, the first side releasably covering the second adhesive layer, wherein the decorative cover is about the same size and shape of the first substrate, and entirely covers the first substrate, and wherein the decorative cover can be selectively removed to expose the second adhesive layer.

For clarity, the decorative cover comprising the first release layer may comprise a decorative cover bonded to a release layer. For example, the first side of the decorative cover may be bonded to the first release layer. Alternatively, the decorative cover may be used without a separate release layer to cover the second adhesive layer. For example, the decorative cover may have a release agent coated onto its first side to create the first release layer, or the first release layer may be the first side of the decorative cover if the decorative cover itself has a low enough surface energy so that no release layer is needed, while still retaining the ability to protect and release from the adhesive layer.

The example embodiment may also comprise a second substrate having a releasable or non-releasable adhesive layer on a first side and a second side, wherein the second side of the second substrate faces the first substrate.

The example embodiment may also comprise a decorative layer comprising a second decorative element, the decorative layer disposed between the first substrate and the second substrate, the decorative layer adhered on a first decorative layer side to the adhesive layer on the second side of the second substrate and having a second decorative layer side facing the first substrate, the second decorative layer side being adhered to the first adhesive layer of the first substrate, wherein the second decorative element is visible when the decorative cover is selectively removed. Once the decorative cover has been removed the second decorative element may be seen on the decorative layer through the first substrate, creating a displaying effect.

The example embodiment may also comprise a second release layer positioned to cover the adhesive layer on the first side of the second substrate. The second release layer may be larger than the second substrate, so that the second release layer may be more easily peeled away from the adhesive layer on the first side of the second substrate. The second release layer of the multi-purpose sticker acts to protect and transport the sticker before use.

In yet another example embodiment, the multi-purpose sticker may comprise a substrate comprising a decorative element, a releasable or non-releasable first adhesive layer disposed on a first side of the substrate, and a releasable or non-releasable second adhesive layer disposed on a second side of the substrate, wherein the decorative element is visible through an adhesive layer.

This example embodiment may also comprise a transparent release layer cover positioned to cover the second adhesive layer, wherein the decorative element is visible through the transparent release layer cover, and wherein the transparent release layer cover may be about the same size and shape of the substrate and may be selectively removed to expose the second adhesive layer.

The example embodiment may further comprise a release layer positioned to cover the first adhesive layer. The release layer may be larger than the substrate, so that the release layer may be more easily peeled away from the substrate's first adhesive layer.

There has thus been outlined, rather broadly, some of the embodiments of the multi-purpose sticker in order that the detailed description thereof may be better understood, and in order that the present contribution to the art may be better appreciated. There are additional embodiments of the multi-purpose sticker that will be described hereinafter and that will form the subject matter of the claims appended hereto. In this respect, before explaining at least one embodiment of the multi-purpose sticker in detail, it is to be understood that the multi-purpose sticker is not limited in its application to the details of construction or to the arrangements of the components set forth in the following description or illustrated in the drawings. The multi-purpose sticker is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
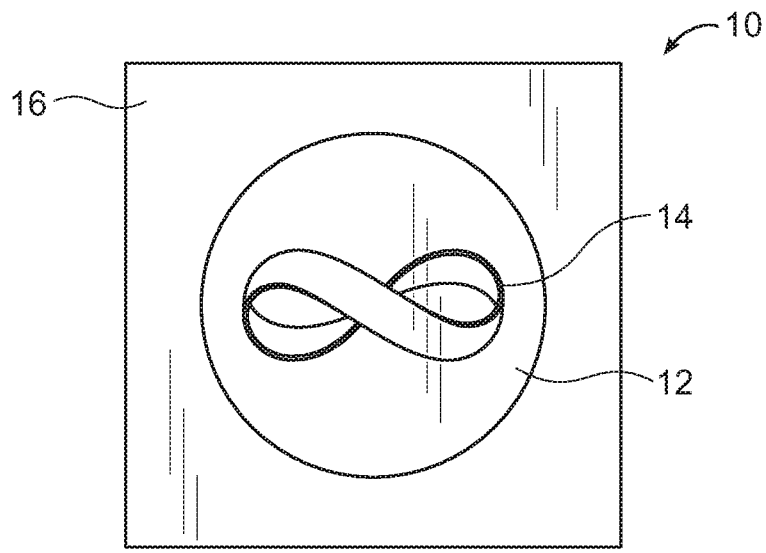
FIG. 1 is a top view of a multi-purpose sticker in accordance with an example embodiment.
Figure 2:
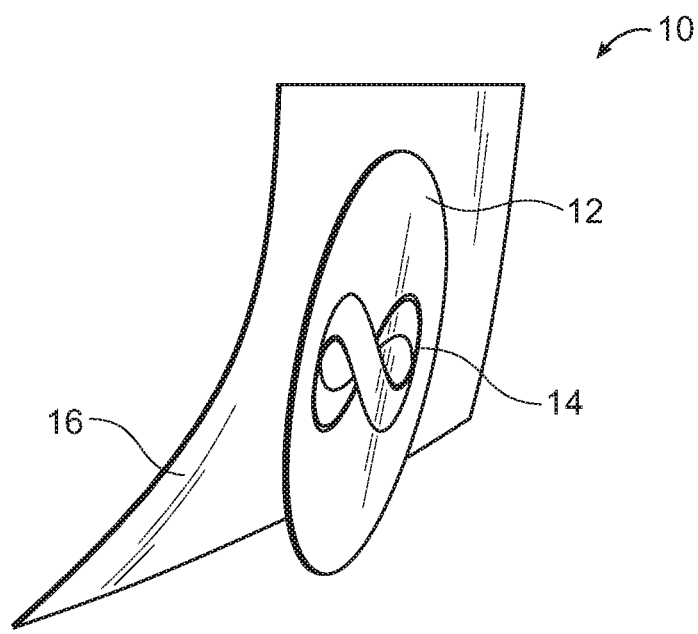
FIG. 2 is a perspective view of a multi-purpose sticker in accordance with an example embodiment.
Figure 3A:
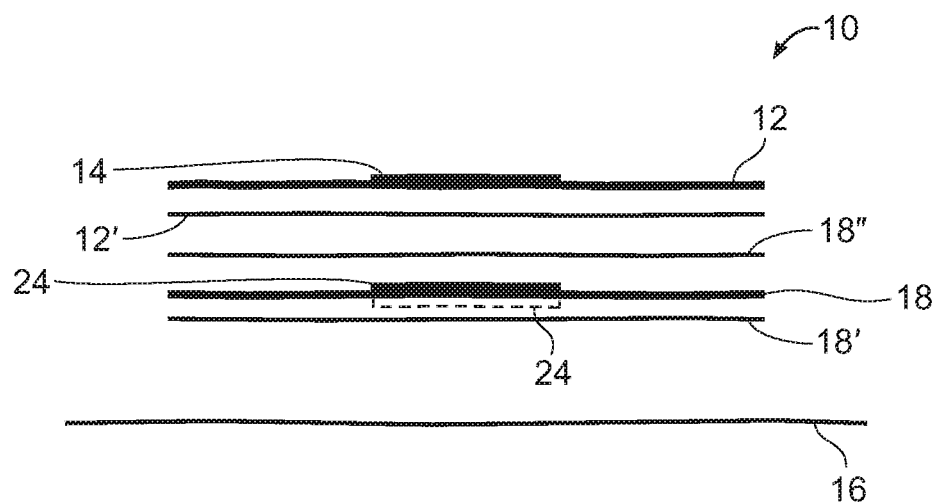
FIG. 3A is a side, exploded view of several layers of a multi-purpose sticker in accordance with an example embodiment.

An example multi-purpose sticker 10, such as the one shown in FIGS. 1-2, and 3A, generally comprises a substrate

18, a first adhesive layer 18' disposed on a first side of the substrate 18, and a second adhesive layer 18" disposed on a second side of the substrate 18. The example embodiment may also include a first release layer 12' positioned to cover the second adhesive layer 18", the first release layer 12' having a predefined shape, wherein the first release layer 12' is in contact with the second adhesive layer 18", and a decorative cover 12 comprising the first release layer 12' and having a first side and a second side, and a first decorative element 14 on the decorative cover 12, the first decorative element 14 visible from the second side of the decorative cover 12, the first side of the decorative cover 12 releasably covering the second adhesive layer 18".

As shown in FIG. 3A, the multi-purpose sticker 10 may also include an optional decorative element 24, which may be disposed on a substrate such as substrate 18 and may be visible when the decorative cover 12 is removed. The decorative element 24 may also be visible through the transparent release layer cover 15 when it is used in place of the decorative cover 12, as shown in FIG. 3E. As shown in FIG. 3A, the decorative element 24 may be disposed on either side of substrate 18, or on either side of any substrate or layer where it is used.

When present, the decorative element 24 may be placed onto any substrate or decorative layer within any embodiment of the multi-purpose sticker. For example, as shown in the drawings, the decorative element 24 may be comprised on substrate 18, substrate 22, or decorative layer 20, depending on the embodiment used. Either decorative element 14 or 24 may be placed onto either side of the layer they are comprised on. The decorative elements 14 and 24 may be placed using any technique suitable to add a decorative element. For example, the decorative elements 14 and 24 may be added to their respective layers using printing, embossing, stamping, etc. Multiple techniques can also be used together for the decorative elements, for example, either decorative element may have a printed design that is in register with an embossed design.

Just as a regular sticker can display anything a person wishes, so too can the multi-purpose sticker. In the multi-purpose sticker, either decorative element 14 or 24 may comprise any design, pattern, shape, image, text, etc. Also, either decorative element 14 or 24 may comprise an informational element. For example, in some instances the decorative elements 14 and 24 may comprise informational elements and may provide directions or instructions on how to use a product, or may provide information or a fun fact that may interest a person or child, depending on the implementation of the multi-purpose sticker. The decorative elements 14 and 24 may be any pattern or design and may comprise a company name, logo, slogan, message, picture, drawing, instructions, information, etc.

The decorative cover 12 comprising the first release layer 12' may be made using two separate layers, with the second side of the first release layer 12' bonded to the first side of the decorative cover 12, wherein the first side of the first release layer 12' is in contact with the second adhesive layer 18". Alternatively, the decorative cover 12 may be used without a separate release layer to cover the second adhesive layer 18". For example, as shown in FIG. 3D, the decorative cover 12 may have a release agent coated onto its first side to create the first release layer, or the first side of the decorative cover itself may have a low enough surface energy to act as the first release layer so that no separate release layer is needed.

A release layer may also be referred to as a liner or release liner. This may include any standard release liner or may comprise a liner that is only coated with a releasing agent on one side, with the other side being printable, for example. Such a release liner may be used as a decorative cover 12, with a releasing agent on one side and a printed or embossed decoration, pattern, etc., on the other. Release layers 12' and 16 may have different surface energies, so that either one may be designed to release first. For example, release layer 16 may be designed to release first, prior to the decorative cover 12 and release layer 12' releasing from the sticker. In addition to a releasing agent, any release layer or liner of the example embodiments may simply be made of any material that has a low enough surface energy so that it is readily releasable from the adhesive layer used without damaging the adhesive. For example, certain papers, plastics, etc., may inherently have low enough surface energies to readily release from the adhesive layer, especially if a releasable (i.e., removable or repositionable) adhesive is used.

The decorative cover 12 may be about the same size and shape of the substrate 18 and may entirely cover the substrate 18. Alternatively, the multi-purpose sticker's cover may extend beyond the substrate in at least one location, allowing the cover to be more easily grasped and peeled away from the sticker. There are multiple ways that the sticker's cover may extend beyond its topmost substrate in at least one location, for example, the multi-purpose sticker's cover may be larger than the layers below it, or the cover may have one or multiple small sections that extend beyond the layers below it, to facilitate easy grasping in order to peel it away from the rest of the sticker. Further, any other layer or portion of the sticker beneath its cover may be cut back slightly to define an area where the cover extends beyond the layers below it, allowing the cover to be more easily grasped and peeled away from the adhesive layer below it. This holds true for all embodiments of the multi-purpose sticker described herein, also including the embodiments using a transparent release layer cover. The decorative cover 12 may be made of or comprise film, foil, metal, metal foil, paper, plastic, vinyl, wood, or virtually any other suitable material.

The decorative cover 12 may include a decorative element 14, such as printing or an embossed design, or both, or any other suitable method may be used to place a decorative element onto the decorative cover. For example, the decorative element 14 may have a printed design that is in register with an embossing. The decorative element 14 will most commonly be placed on the second side of the decorative cover 12, as shown in the drawings, and makes up the decorative element that is visible from the second side of the decorative cover 12. Though the decorative element 14 will most commonly be placed onto the second side of the decorative cover 12, it may be placed onto either side of the decorative cover as long as it remains visible from the second side of the decorative cover (note that this holds true for all embodiments of the multi-purpose sticker that utilize a decorative cover with a decorative element). For example, if the decorative cover 12 is transparent, the decorative element 14 may either be placed in its most common location on the second side of the decorative cover 12, or the decorative element 14 may instead be placed on the first side of the decorative cover 12 and yet remain visible from the second side of the decorative cover as it would be seen through the transparent decorative cover. If the decorative cover 12 is transparent, the first decorative element 14 may even be placed onto the side of the first release layer 12' facing the decorative cover 12 and may be the decorative element that is visible from the second side of the decorative cover as it would be seen through the transparent decorative cover. For simplicity, the drawings only show the decorative element 14 in its most common position on the second side of the decorative cover 12.

The decorative cover 12 may be selectively removed to expose the second adhesive layer 18". When referring to the removal of the decorative cover 12 from the sticker 10, this includes the removal of the first release layer 12', when present, as the decorative cover 12 comprises the first release layer 12'. If two separate layers are used to form the decorative cover 12 comprising the first release layer 12', then the decorative cover may be about the same size and shape as the first release layer 12'. For example, the decorative cover 12 and the first release layer 12' may be die-cut at the same time from two sheets of material, and thus be the same size. Alternatively, the two materials may be separately formed and then the decorative cover 12 bonded to the first release layer 12', in which case the two materials may differ slightly in size or shape, although still covering and protecting the second adhesive layer 18" of the substrate 18, which is the general purpose of the first release layer 12'. As shown in the figures, the decorative cover may be round, but it may also be cut into other shapes, patterns, logos, etc., so that the shape itself becomes a decorative feature.

The example embodiment may also comprise a second release layer 16 positioned to cover the first adhesive layer 18'. The release layer 16 covers the sticker's bottommost adhesive layer and may be included in any embodiment of the multi-purpose sticker 10. The release layer 16 may be larger than the remaining layers in any embodiment of the sticker 10, as shown in FIGS. 1-4. This allows for the sticker 10 to be easily peeled away from the release layer 16. The release layer 16 acts to protect the multi-purpose sticker 10 before use.

For clarity, when referencing the layers of the multi-purpose sticker within this application, we are referring to the sticker's cover as being the top of the sticker and the release layer 16 as being the bottom of the sticker, as shown in the drawings. When referring to the sticker's topmost adhesive layer, this refers to the adhesive layer closest to the sticker's cover. For example, adhesive layer 18" would be the topmost adhesive layer in FIGS. 3A and 4A, while adhesive layer 22' would be the topmost adhesive layer in FIGS. 3G and 4D. When referring to the sticker's bottommost adhesive layer, we are referring to the adhesive layer closest to the release layer 16 (i.e., the adhesive layer furthest from the sticker's cover). For example, adhesive layer 18' would be the bottommost adhesive layer in FIGS. 3A and 3E, while adhesive layer 22' would be the bottommost adhesive layer in FIGS. 3B and 4A.

Figure 4A:
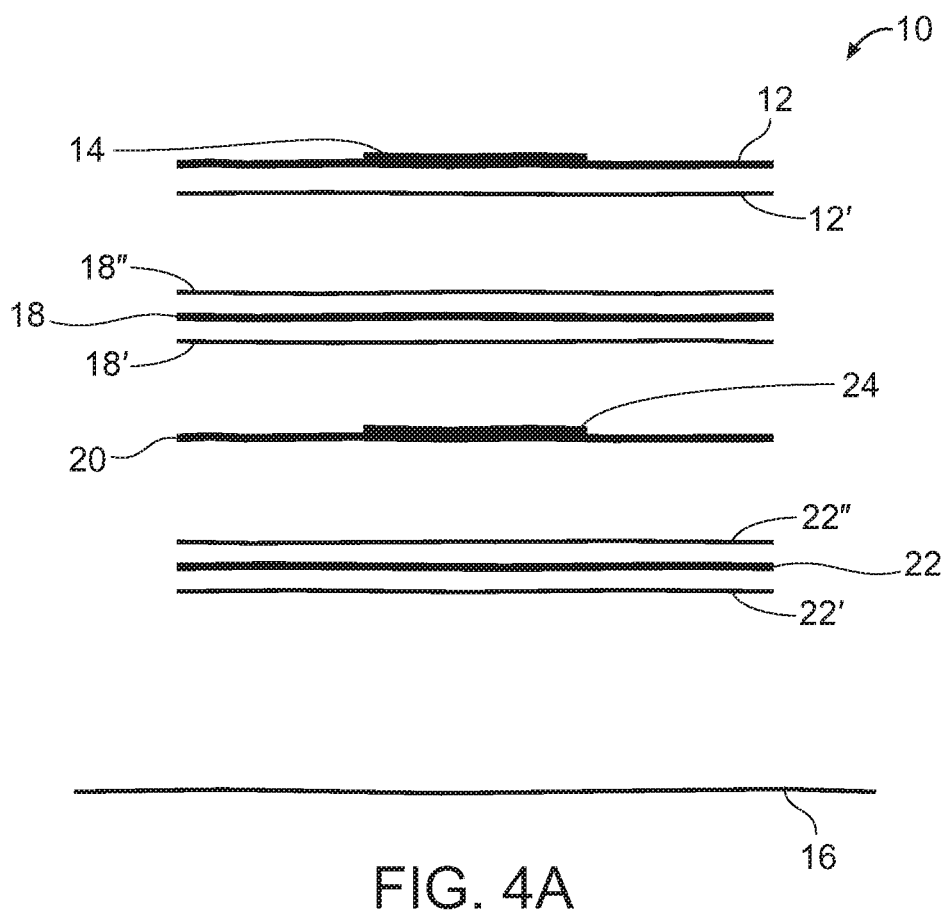
FIG. 4A is another side, exploded view of several layers of a multi-purpose sticker in accordance with an example embodiment.
Figure 4B:
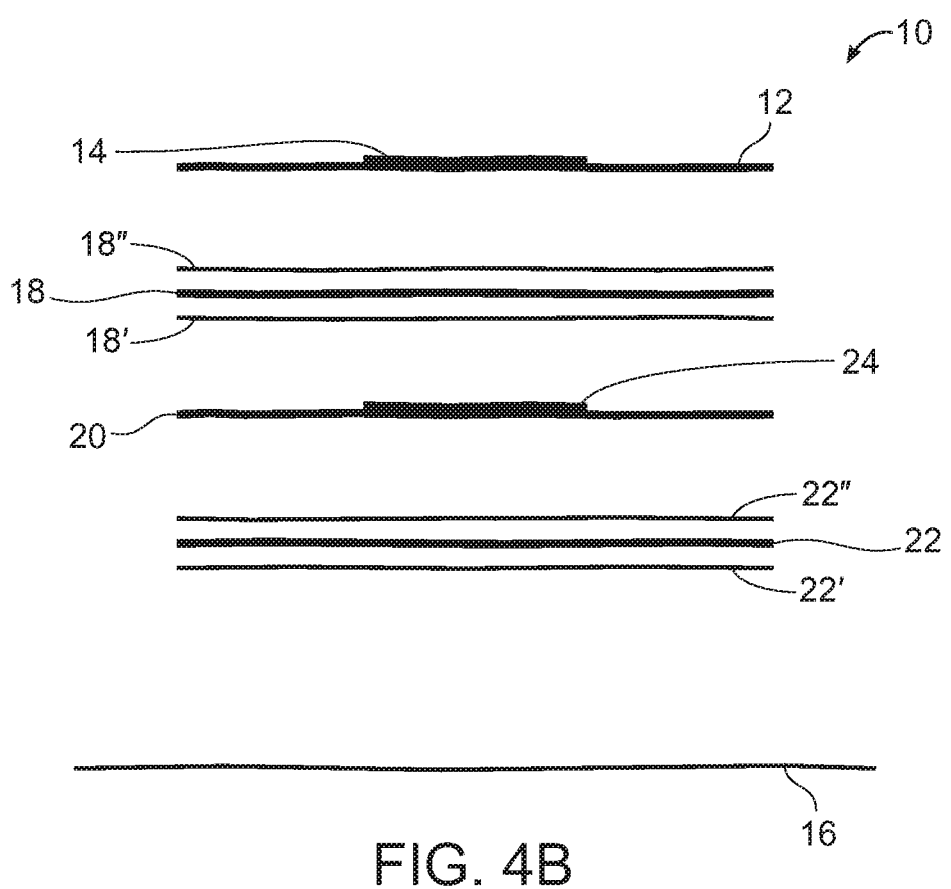
FIG. 4B is another side, exploded view of several layers of a multi-purpose sticker in accordance with an example embodiment.

Some example embodiments, as shown in FIGS. 4A and 4B, for example, may also have a decorative layer 20 that remains visible even after the decorative cover 12 (and, if present, release layer 12') is peeled off the sticker 10. One example embodiment of the multi-purpose sticker 10 with this feature, as shown in FIG. 4A, may comprise a transparent first substrate 18, a releasable or non-releasable first adhesive layer 18' disposed on a first side of the first substrate 18, a releasable or non-releasable second adhesive layer 18" disposed on a second side of the first substrate 18, and a first release layer 12' in contact with the second adhesive layer 18". The example embodiment may also include a decorative cover 12 comprising the first release layer 12' and having a first side and a second side, and a first decorative element 14 visible from the second side, the first side releasably covering the second adhesive layer 18", wherein the decorative cover 12 may be about the same size and shape of the first substrate 18, and may entirely cover the first substrate 18, and wherein the decorative cover 12 may be selectively removed to expose the second adhesive layer 18".

The example embodiment may also comprise a second substrate 22 having a releasable or non-releasable adhesive layer on a first side 22' and a second side 22", wherein the second side of the second substrate 22 faces the first substrate 18.

For clarity, a non-releasable adhesive refers to any type and strength of permanent pressure-sensitive adhesive, while a releasable adhesive refers to any type and strength of temporary pressure-sensitive adhesive, including but not limited to removable and repositionable adhesives.

The example embodiment may also comprise a decorative layer 20 comprising a second decorative element 24, the decorative layer 20 disposed between the first substrate 18 and the second substrate 22, the decorative layer 20 adhered on a first decorative layer side to the adhesive layer 22" on the second side of the second substrate 22 and having a second decorative layer side facing the first substrate 18, the second decorative layer side being adhered to the first adhesive layer 18' of the first substrate 18, wherein the second decorative element 24 is visible when the decorative cover 12 is selectively removed. Once the decorative cover 12 has been removed, the second decorative element 24 may be seen on the decorative layer 20 through the transparent first substrate 18, creating a displaying effect.

As with decorative element 14, decorative element 24 may be or include printing or an embossed design, or both, and any other suitable method may be used to place a decorative element onto the decorative layer 20. For example, the decorative element 24 may have a printed design that is in register with an embossed design. As appears in many embodiments of the multi-purpose sticker, having both a decorative cover 12 and a decorative layer 20 allows for a decorative element (either decorative element 14 or 24) to be seen whether or not the sticker's topmost adhesive layer is used. Decorative element 14 will be seen on decorative cover 12 if the sticker's topmost adhesive layer is not used, and decorative element 24 will be seen on decorative layer 20 when the decorative cover 12 is removed and the topmost adhesive layer is used. This allows for an advertising image such as a company name, a company logo, a company slogan, a message, picture, or drawing, or any design desired to be seen at all times either on the decorative cover 12 or the decorative layer 20. The same holds true for any embodiment of the multi-purpose sticker that contains the decorative element 24, whether it is placed onto substrate 18, substrate 22, or decorative layer 20.

For clarity, the first side of the decorative cover 12 comprises the first release layer 12', and it is the first release layer 12' portion of the decorative cover 12 which is in contact with and releasably covers the sticker's topmost adhesive layer. When describing the removal of the decorative cover 12 from the sticker 10 within this application, this includes removing release layer 12' when present, as the decorative cover 12 comprises the release layer 12'. It may also refer to removing just the decorative cover 12 in the embodiments where no separate release layer 12' is needed. In these embodiments the decorative cover 12 may have a low enough surface energy so that the cover itself can protect and release from the adhesive layer below it, and the decorative cover itself acts as the release layer.

The decorative cover 12 may comprise the first release layer 12' by having the release layer bonded to the decorative cover, by having a release agent coated onto the back of the decorative cover to create the release layer, or the back of the decorative cover itself may act as the release layer if the decorative cover is made from a material that has a low enough surface energy to protect and release from the sticker's topmost adhesive layer. The decorative cover may also comprise a release layer by having a releasing element (i.e., release layer, release coating, etc.) applied to it using any other suitable method that will allow the decorative cover the ability to protect and release from the adhesive layer below it.

The example embodiment may also comprise a second release layer 16 positioned to cover the adhesive layer 22' on the first side of the second substrate 22. The second release layer 16 may be larger than the second substrate 22, so that the second release layer 16 may be more easily peeled away from the adhesive layer 22' on the first side of the second substrate 22. The second release layer 16 of the multi-purpose sticker acts to protect and transport the sticker 10 before use.

B. Operation and Use of Preferred Embodiments

In use, the multi-purpose sticker 10 may comprise one, two, or multiple substrate layers, such as layers 18, 22, and 26, each of which may be coated on one or both sides with an adhesive layer, which may be a high-tack (i.e., permanent) adhesive layer or a releasable (i.e., removable or repositionable) adhesive layer, or any combination thereof. The adhesive layer or layers may be made in any strength of adhesive desired, and may be non-releasable, releasable, or repositionable in nature. Any substrate described herein may be a transparent, synthetic polymeric material, such as polypropylene or polyester film, although any of the substrates may also be non-transparent, printable, etc. As shown in FIGS. 4A and 4B, the multi-purpose sticker 10 may have a substrate 18, which may be transparent to reveal a decorative layer 20. In either embodiment, the substrates 18 and 22 each may include two layers of releasable or non-releasable, pressure sensitive adhesive 18', 18", 22', and 22" as shown.

For clarity, any of the adhesive layers within any embodiment of the multi-purpose sticker may be made of any type and strength of pressure-sensitive adhesive, and any combination of adhesive layers may be used in any embodiment of the multi-purpose sticker. By utilizing different combinations of types and strengths of adhesive layers, any embodiment of the multi-purpose sticker may be designed to separate between layers to add functionality to the stickers. This feature allows a designer to choose whether or not they want the layers of the sticker's double-sided adhesive layer to separate, and if so, allows them to choose where and how the layers of the multi-purpose sticker will separate. Any embodiment of the multi-purpose sticker may be designed so the sticker's double-sided adhesive layer is unable to separate, or it may be designed to separate between any chosen layers by utilizing different types and strengths of adhesive layers within the sticker.

As stated above, any of the adhesive layers present in any embodiment of the multi-purpose sticker may be made of non-releasable, releasable, or repositionable pressure sensitive adhesives, or any combination thereof. For example, one possible combination for the adhesive layers 18', 18", 22', and 22" within the double-substrate embodiment might have adhesive layers 22', 22" and 18' as non-releasable adhesive layers and layer 18" as a releasable adhesive layer. This combination would allow the sticker to close an envelope securely using non-releasable adhesive layer 22' and releasable adhesive layer 18" would be able to attach the envelope to a gift. Using a releasable adhesive for adhesive layer 18" would allow for the recipient of said gift to peel the envelope off the gift with minimal damage to either the gift or the envelope itself and would allow easy viewing of the decorative layer 20 through substrate 18 and its adhesive layers.

Single Substrate Embodiment

In one example embodiment (for example, as shown in FIGS. 1 and 3A), the multi-purpose sticker 10 may comprise 3 main layers which, as discussed above, may comprise multiple layers themselves, such as a substrate with an adhesive layer on either side, etc. The first main layer comprises a decorative cover 12 with a non-stick backing 12' (i.e., a release layer or release liner backing). This layer is also known as the "anti-sticker layer". This layer acts as a decorative covering to the double-sided adhesive layer, which is the second main layer. This second main layer generally comprises a substrate 18 and two adhesive layers 18' and 18", one on either side of the substrate. The double-sided adhesive layer allows a user to stick two objects together, and can be made with any strength of adhesive, on either side, and can be made of non-releasable (i.e., permanent) or releasable (i.e., removable or repositionable) adhesives, or any combination thereof. The third main layer generally comprises a conventional non-stick backing (i.e., release layer backing) 16, which protects the sticker 10 until use by a consumer or user, but the sticker 10 may also come already placed onto an envelope or other device to allow them the features contained within the multi-purpose sticker.

For clarity, the "anti-sticker layer" generally comprises a decorative cover with a non-stick backing (i.e., release layer backing) and forms the first main layer of the multi-purpose sticker. It is called the "anti-sticker layer" because it camouflages itself as a sticker, but functions in a way opposite a regular sticker. Where a regular sticker has an adhesive layer, the "anti-sticker layer" instead has a non-stick backing (i.e., release layer backing). The decorative cover provides decoration and camouflages the adhesive layer beneath it, while the non-stick backing (i.e., release layer backing) protects and allows release from said adhesive layer. The "anti-sticker layer" allows for the dual function of the multi-purpose sticker by allowing the multi-purpose sticker to appear and function as a regular sticker, or by its removal, allows access to and use of the adhesive layer hidden beneath it.

The "anti-sticker layer" may be made by bonding a release layer to the back of the decorative cover, by coating a release agent onto the back of the material used for the decorative cover, or the non-stick backing (i.e., release layer backing) may simply be the back of the decorative cover if the material chosen for the decorative cover has a low enough surface energy to both protect and easily peel from the adhesive layer. If a material of sufficiently low surface energy is used for the decorative cover, the material itself may act as both the decorative cover and its release layer backing. For example, certain types of paper and plastic membranes may inherently have a surface energy that is sufficient to both protect and easily peel from the adhesive layer without causing damage to the adhesive layer, especially if a releasable (i.e., removable or repositionable) adhesive layer is used beneath it. The "anti-sticker layer" may also be fabricated using any other method suitable to add a release layer or a releasing element onto the back of the decorative cover, so that the decorative cover may both protect and release from the adhesive layer beneath it.

As shown in FIG. 3A, the multi-purpose sticker 10 may have a single substrate 18 with an adhesive layer 18' and 18" on either side. The substrate 18 may comprise an optional decorative element 24 on either side of the substrate as shown. The substrate 18 may be printable and have the optional decorative element 24 printed onto it, or the decorative element 24 may be added using any other suitable method to add a decorative element onto the substrate 18. The decorative element 24 may be added directly onto the substrate 18 prior to releasable, non-releasable, or repositionable adhesive layers 18' and 18" being applied over the substrate. It is also possible to leave this decorative element 24 off, in order to simply use the sticker 10 as a sticker with a decorative cover 12 that may be removed to reveal a transparent double-sided adhesive layer that can be used to attach two items together.

Though the optional decorative element 24 will most often be placed onto the side of the substrate 18 facing the decorative cover 12, the decorative element can be placed onto either side of the substrate, especially when a transparent substrate is used (note that this holds true for any substrate containing a decorative element and also holds true for the decorative layer 20 in the double-substrate embodiments). For example, as shown in FIG. 3A, the optional decorative element 24 may be placed onto the side of the substrate 18 facing the decorative cover 12 as indicated by the solid line representation of the decorative element 24, or the decorative element 24 may be placed onto the opposite side of the substrate 18 (i.e. the side of the substrate 18 facing away from the decorative cover 12) as indicated by the dashed line representation of the decorative element 24. Although only shown in FIG. 3A, this holds true for any embodiment of the multi-purpose sticker (including, but not limited to, all embodiments using the decorative cover 12 and all embodiments using the transparent release layer cover 15). For example, in the double-substrate embodiment, the decorative element 24 may be placed onto either side of the decorative layer 20, especially when the decorative layer 20 is transparent. Although the decorative element 24 can be placed on either side of the layer it comes on, for simplicity, all drawings other than FIG. 3A show the decorative element 24 in its most common location on the side facing the sticker's cover.

Figure 5:
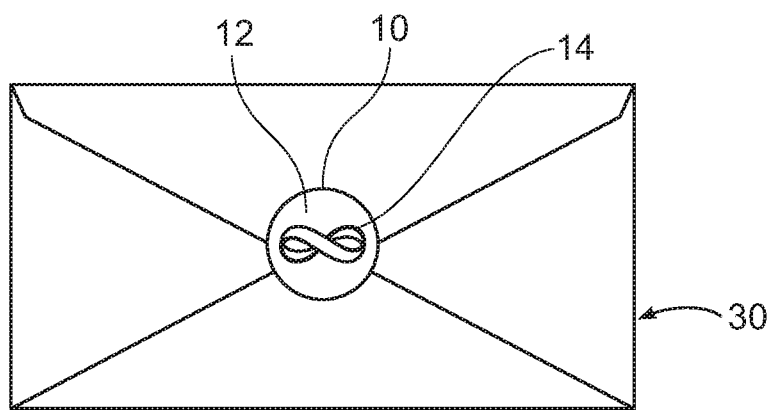
FIG. 5 is a top view of a multi-purpose sticker sealing an envelope in accordance with an example embodiment.

In this example embodiment, the sticker 10 may be used in several ways: to decorate an item, or to seal an envelope. In such a use, only one substrate is needed, and the decorative cover 12 can remain in place on the sticker 10 and act to camouflage the multi-purpose sticker as a normal sticker, and the "top" layer of adhesive 18" is not used as will a normal double-sided adhesive or tape, but instead is used only to hold the decorative cover 12 in place. To seal an envelope, a user can peel the normal non-stick backing or release layer 16 away from the sticker, as shown in FIG. 2, and apply the sticker 10 in the desired location, such as the back of an envelope, as shown in FIG. 5, in order to seal and decorate the envelope 30. As also shown, the decorative element 14 is visible on the decorative cover 12.

As mentioned briefly above, the decorative element 14, as well as the decorative element 24, may be a printed or embossed pattern containing a company name, a company logo, a company slogan, a message, a picture or drawing, or any design desired, etc. The designs or patterns selected for the decorative elements 14 and 24 can be applied to the decorative cover 12 and either substrate 18, substrate 22, or the decorative layer 20, depending on the embodiment chosen, using any suitable design technique such as printing, embossing, stamping, die cutting, etc. As one example, the decorative element 14 or 24 may be an embossed and printed company logo, or an advertisement. For example, the sticker may comprise the logo of a greeting card company. Furthermore, the decorative cover may be cut into a decorative shape or design.

Figure 6:
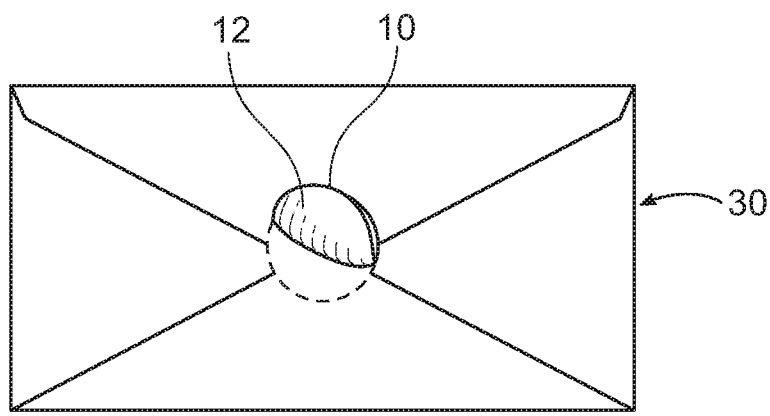
FIG. 6 is another top view of a multi-purpose sticker sealing an envelope in accordance with an example embodiment.
Figure 7:
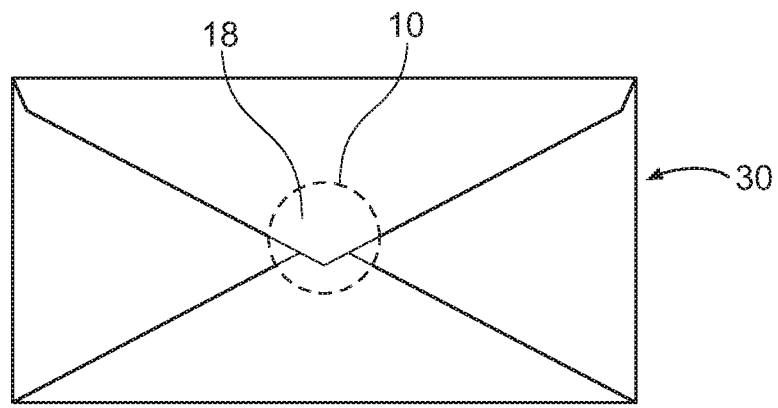
FIG. 7 is another top view of a multi-purpose sticker sealing an envelope, with an adhesive layer exposed, in accordance with an example embodiment.
Figure 8:
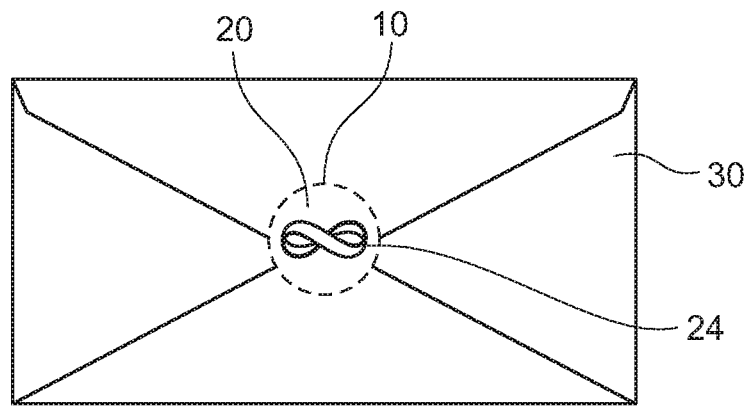
FIG. 8 is another top view of a multi-purpose sticker sealing an envelope, with an adhesive layer exposed and a decorative element visible, in accordance with an example embodiment.

As an additional use, typically employed when the sticker 10 is used to seal an envelope (such as one containing a greeting card), the decorative cover 12 may be peeled off of the substrate 18 to expose the top adhesive layer 18", which allows the sticker to function as a conventional double-sided adhesive or tape. FIG. 6 shows the decorative cover 12 being peeled off of the sticker 10, and FIG. 7 shows the sticker 10 after the decorative cover 12 has been removed, with the sticker 10 attached to an envelope 30. In the embodiment shown, the double-sided adhesive layer comprised of substrate 18 and adhesive layers 18' and 18" remain on the envelope but may not be highly visible if the substrate 18 is transparent. However, the substrate 18 may also comprise a decorative element, and may be transparent or non-transparent, in which case the optional decorative element 24 may be visible once the decorative cover 12 has been removed, similar to what is shown in FIG. 8.

Figure 9:
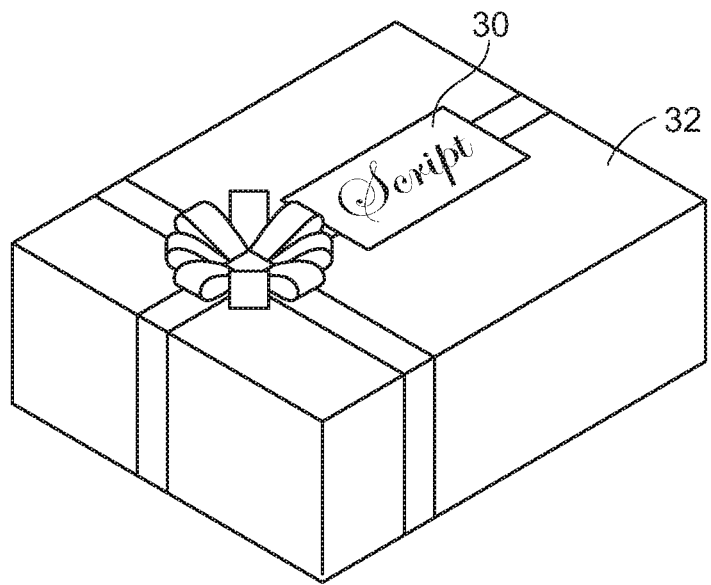
FIG. 9 is a perspective view of an envelope attached to a gift with a multi-purpose sticker, in accordance with an example embodiment.

In this mode, after the decorative cover 12 has been peeled off of the sticker, the sticker may be used to attach the envelope (likely containing a greeting card, etc.) to a gift using adhesive layer 18", as shown in FIG. 9. Alternatively, the sticker 10 of this example embodiment may be used for a child's reward system, wherein a board tracking the child's progress, such as with a star reward system, may be used. For example, a number of stickers could be used decoratively, and as an indicator of the child's progress (in any number of categories), the child may peel off the decorative cover and replace it with a star at the highest level achieved.

Figure 3B:
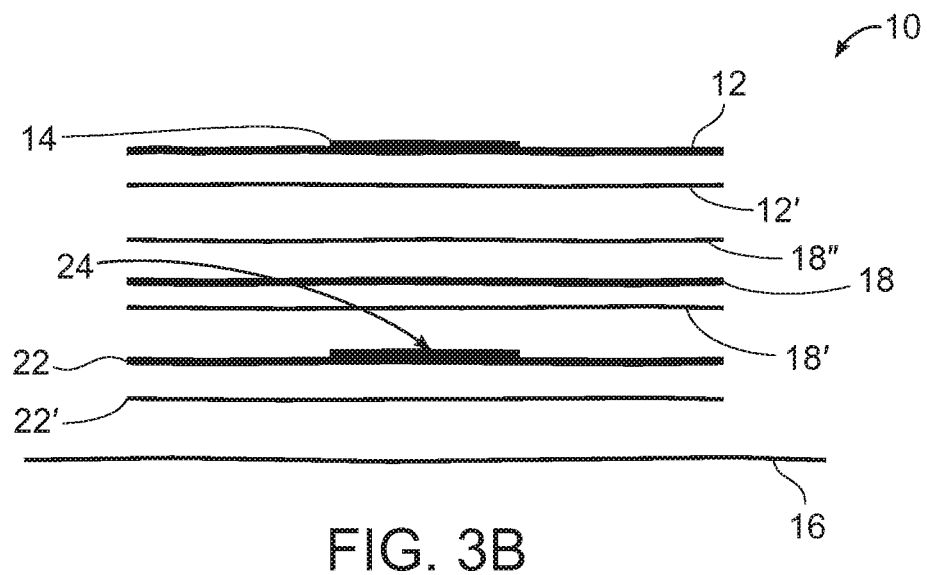
FIG. 3B is another side, exploded view of several layers of a multi-purpose sticker in accordance with an example embodiment.

Another example embodiment, as shown in FIG. 3B, may comprise a first substrate 18, a releasable or non-releasable first adhesive layer 18' disposed on a first side of the first substrate 18, a releasable or non-releasable second adhesive layer 18" disposed on a second side of the first substrate 18, a first release layer 12' positioned to cover the second adhesive layer 18", the first release layer 12' having a predefined shape, wherein the first release layer 12' is in contact with the second adhesive layer 18", and a decorative cover 12 comprising the first release layer 12' and having a first side and a second side, and a first decorative element 14 visible from the second side of the decorative cover 12, the first side of the decorative cover 12 releasably covering the second adhesive layer 18", wherein the decorative cover 12 may be about the same size and shape of the first substrate 18, and entirely covers the first substrate 18, and wherein the decorative cover 12 can be selectively removed to expose the second adhesive layer 18". The example embodiment may also comprise a second substrate 22 comprising a second decorative element 24 and having a first side and a second side, the first side of the second substrate 22 in contact with the first adhesive layer 18', and a releasable or non-releasable third adhesive layer 22' disposed on the second side of the second substrate 22, wherein the second decorative element 24 is visible through the first substrate 18 and its adhesive layers 18' and 18" when the decorative cover 12 is selectively removed.

The example embodiment may also comprise a second release layer 16 positioned to cover the third adhesive layer 22'. The second release layer 16 may be larger than the second substrate 22, so that the second release layer 16 may be more easily peeled away from the third adhesive layer 22'. The second release layer 16 protects the sticker 10 before use.

This embodiment is similar to adding a transparent double-sided adhesive (comprising substrate 18 with its adhesive layers 18' and 18") onto a "regular sticker" (comprising substrate 22 with its adhesive layer 22' and decorative element 24), which may then be covered by the "anti-sticker layer" (comprising decorative cover 12 and release layer 12'). This embodiment is also similar to adding a "regular sticker" (comprising substrate 22 with its adhesive layer 22' and decorative element 24) below a single-substrate embodiment of the multi-purpose sticker (comprising layers 18, 18', 18", 12, and 12', as shown within FIG. 3B). The substrate 22 may be printed on, embossed, etc., to create the decorative element 24 on the substrate 22.

Figure 3C:
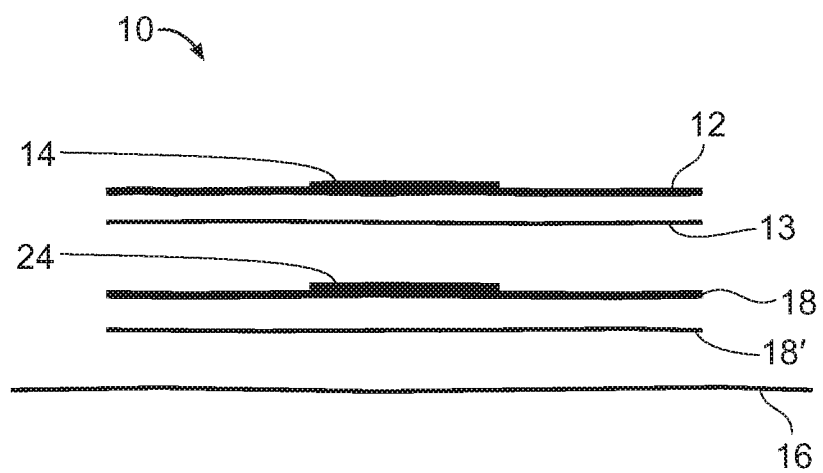
FIG. 3C is another side, exploded view of several layers of a multi-purpose sticker in accordance with an example embodiment.
Figure 3D:
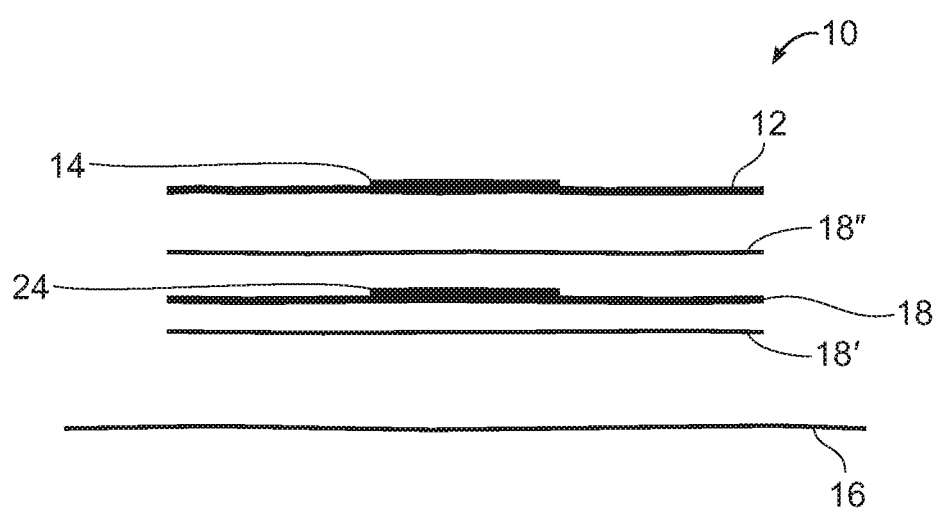
FIG. 3D is another side, exploded view of several layers of a multi-purpose sticker in accordance with an example embodiment.
Figure 3E:
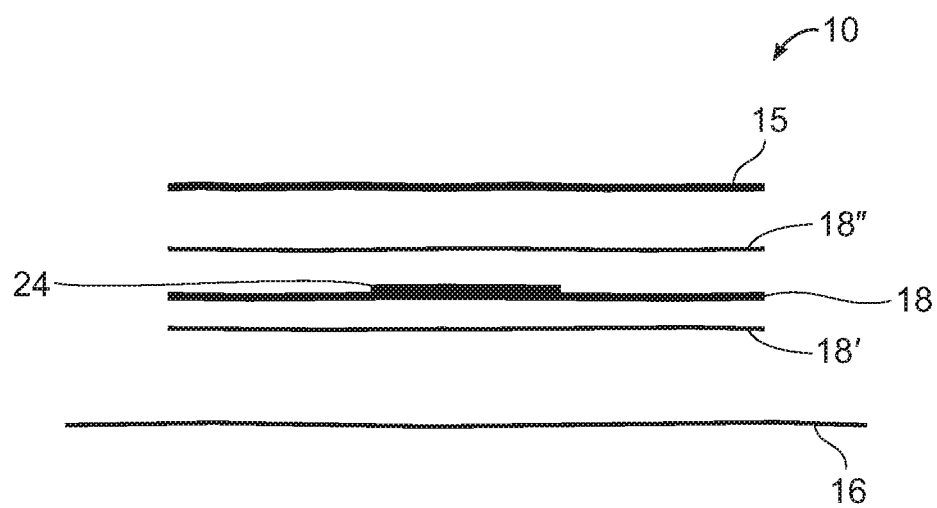
FIG. 3E is another side, exploded view of several layers of a multi-purpose sticker in accordance with an example embodiment.

Another possible embodiment is shown in FIG. 3C. In this embodiment, the decorative cover 12 has an adhesive layer 13 attached, the adhesive layer 13 may be releasable so that the decorative cover 12 can be removed and used as a temporary decoration, while adhesive layer 18' may be a releasable or non-releasable adhesive, for attaching the sticker to an item, such as an envelope. This example embodiment, as shown in FIG. 3C, may comprise a substrate 18 comprising a decorative element 24 and having a first side and a second side, and a releasable or non-releasable first adhesive layer 18' disposed on the first side of the substrate 18. The decorative element 24 may be printed onto the substrate 18, or any other suitable method may be used to place a decorative element 24 on the substrate 18. The example embodiment may also comprise a decorative cover 12 comprising a decorative element 14 and having a first side and a second side, the first side comprising a releasable or non-releasable adhesive layer 13, wherein the adhesive layer 13 is in contact with the second side of the substrate 18.

The decorative cover 12 may be about the same size and shape of the substrate 18, wherein the decorative cover 12 may be selectively removed to expose the substrate 18 and the decorative element 24. The decorative element 24 comprised on the substrate 18 may be visible once the decorative cover 12 has been selectively removed from the sticker. The embodiment may also have a release layer 16 positioned to cover the first adhesive layer 18'. The release layer 16 may be larger than the substrate 18, so that the release layer 16 may be more easily peeled away from the adhesive layer 18'. The release layer 16 acts to protect the sticker 10 until its use.

As is true with other embodiments of the multi-purpose sticker, substrate 18 may be printable, so that a decorative element 24 can be printed on it at any point in the manufacturing process. The decorative element 24 may also be added to the substrate 18 using any other method suitable for adding a decorative element onto the substrate. Also, in this embodiment, the decorative element 24 will be visible once the decorative cover 12 is peeled away from the sticker. This embodiment of the multi-purpose sticker may be used, for example, for a child's meal at a restaurant. For example, the sticker 10 may be permanently attached by layer 18' on a meal box. The child receiving the meal box may then peel the layers 12 and 13 off, and use the removable sticker to decorate his or her shirt, as a game piece, etc. When the layers 12 and 13 are removed, decorative element 24 will be visible, and may be in the form of a game piece (similar to a peel off game on a drink or other packaging), or may include an interesting and fun design or information that may interest a child.

Another use for this embodiment could be as a label that can be peeled back to reveal further information underneath, such as drug facts. A multi-purpose sticker 10 with this same function may be implemented as shown in FIG. 4B, where layer 18' is a removable or repositionable adhesive layer, and layer 18" is a permanent adhesive layer. As shown in FIG. 4B, the decorative layer 20 may include a decorative element 24 printed, positioned or placed on it. As with other embodiments, the decorative element 24 will be visible when the decorative cover 12 is peeled back or removed from the sticker 10.

In yet another example embodiment, as shown in FIG. 3D, the multi-purpose sticker 10 may generally comprise a substrate 18, a releasable or non-releasable first adhesive layer 18' disposed on a first side of the substrate 18, and a releasable or non-releasable second adhesive layer 18" disposed on a second side of the substrate 18. The example embodiment may also include a decorative cover 12 comprising a decorative element 14, the decorative cover 12 in contact with and releasably covering the second adhesive layer 18", wherein the decorative cover 12 can be selectively removed to expose the second adhesive layer 18".

The decorative cover 12 may be about the same size and shape of the substrate 18 and may entirely cover the substrate. The decorative element 14 on the decorative cover 12 may comprise printing, embossing, etc., and may be placed onto the decorative cover using any technique suitable for adding a decorative element onto the decorative cover. The decorative element may also be the design or shape of the decorative cover.

The example embodiment may also comprise an optional second decorative element 24 on the substrate 18, wherein the second decorative element 24 is visible when the decorative cover 12 is selectively removed. The second decorative element 24 may be placed onto either side of the substrate 18 and may be visible on the substrate once the decorative cover 12 has been removed. The second decorative element 24 may be added to the substrate prior to the adhesive layers being applied to the substrate. The decorative element may comprise printing, embossing, etc., and may be applied to the substrate using any method suitable to add a decorative element onto the substrate. The second decorative element 24 is optional, and the multi-purpose sticker may instead just use a transparent substrate with no decorative element contained on the substrate, so that only a transparent double-sided adhesive layer is visible after the decorative cover has been removed.

The example embodiment may also comprise a releasing element on the decorative cover 12. A releasing element may be added onto the decorative cover to allow easier release of the decorative cover from the sticker's topmost adhesive layer. The releasing element may be added to the decorative cover by way of bonding a release layer to the decorative cover, by coating the decorative cover with a release agent, or a releasing element may be added to the decorative cover using any other method suitable to add a releasing element onto the decorative cover (note that this holds true and can be used for any embodiment using the "anti-sticker layer"). The releasing element may also be contained in the inherent properties of the material used for the decorative cover if the material used has a low enough surface energy to both protect and easily release from the sticker's topmost adhesive layer. A decorative cover comprising a releasing element may be used as the "anti-sticker layer" in any embodiment of the multi-purpose sticker.

The example embodiment may further comprise a release layer 16 positioned to cover the first adhesive layer 18'. The release layer 16 may be larger than the substrate 18, so that the release layer may be more easily peeled away from the first adhesive layer 18' and the rest of the multi-purpose sticker.

Double Substrate Embodiment

In addition to the single-substrate embodiment discussed above, the multi-purpose sticker 10 also has a double-substrate embodiment, generally shown in FIGS. 4A, 4B, and FIG. 8. This embodiment has the same overall functionality of the single-substrate embodiment but includes an additional substrate layer. As shown in FIG. 4A, the double-substrate embodiment takes the single-substrate embodiment (comprising a transparent substrate 18, adhesive layers 18' and 18", release layer 12', and decorative cover 12, as shown within FIG. 4A) and includes an additional substrate layer, comprising substrate 22 and adhesive layers 22' and 22", one adhesive layer on either side of the substrate 22. In this embodiment, the second substrate 22 is positioned below a decorative layer 20, the decorative layer 20 comprising a decorative element 24, which can be seen through the transparent first substrate 18 when the decorative cover 12 has been selectively removed. For clarity, the decorative layer 20 may be made of or comprise film, foil, metal, metal foil, paper, plastic, vinyl, wood, or virtually any other suitable material.

As with the single-substrate embodiment, the double-substrate embodiment of the sticker 10 can be used to seal and decorate an envelope, in which case the decorative cover 12 is left in place and displays a decorative element 14, as shown in FIG. 5.

However, once the decorative cover 12 is peeled off of the sticker 10, the decorative layer 20, as well as decorative element 24, can be seen through the transparent, topmost double-sided adhesive layer comprising substrate 18 and adhesive layers 18' and 18", as shown in FIG. 8. Decorative element 24 may have printing or an embossed design, or both, or any other suitable method may be used to place a decorative element onto the decorative layer 20. The decorative element 24 may match the decorative element 14, so that the sticker has the same or similar general appearance even after the decorative cover 12 has been peeled off of the sticker 10, or the decorative elements 24 and 14 may differ from one another (note that this applies to all embodiments described herein). For example, decorative element 14 might show a company logo, whereas decorative element 24 may show a company slogan. At this point, the envelope 30 of FIG. 8 can be attached to a gift or other package 32 using the sticker's topmost adhesive layer 18", as shown in FIG. 9, just as with the single-substrate embodiment. A recipient of a gift with an envelope adhered to it in accordance with this embodiment will see the decorative element 24 through the first substrate 18 once the envelope has been removed from the gift to which it was adhered, and the multi-purpose sticker becomes visible once more on the envelope.

As mentioned above, any given layer of adhesive of the multi-purpose sticker 10 may be releasable or non-releasable and may have different strength as compared to other layers. The latter feature makes it possible for a designer to select where and how the layers of the multi-purpose sticker will separate. For example, in the embodiment of FIG. 4A, layer 18' may be releasable or repositionable, while all other layers are non-releasable. Layer 18" may be slightly weaker than other non-releasable adhesive layers, to facilitate easy removal of the decorative cover 12 without removing layer 18' from the decorative layer 20. In this example, the multi-purpose sticker could be used to seal an envelope and the sticker could be left alone at this point, sealing and providing decoration for the envelope through the decorative cover 12.

If desired, the decorative cover 12 may be selectively removed to expose adhesive layer 18" and allow it to be used to attach the envelope to a gift. When the recipient removes the envelope from the gift, the sticker will separate between adhesive layer 18' and decorative layer 20, leaving substrate 18 and its adhesive layers behind on the gift, and retaining decorative layer 20 with substrate 22 and its adhesive layers on the envelope. The separation of adhesive layer 18' from the decorative layer 20 would allow the recipient of the gift to see the decorative layer 20 unobstructed by substrate 18 and its adhesive layers, what would remain on the envelope would be substrate 22 with its adhesive layers and the decorative layer 20, and it would appear as a normal sticker that is being used to seal an envelope at this point. As another example, both adhesive layers 22" and 18' may be releasable (i.e., removable or repositionable), while the other layers may be of either type. The releasable adhesive layers 22" and 18' would allow the sticker of this embodiment to separate between the decorative layer 20 and adhesive layer 18' into two single-substrate embodiments of the multi-purpose sticker. Specifically, separating between layers 20 and 18' would allow layers 18 and 12 to function as one sticker, and layers 22 and 20 to function as another. These are just a few examples of how different combinations of types and strengths of adhesives can be used within the framework of the multi-purpose sticker to create different versions of the sticker tailored for specific needs. These examples are not limiting, and any combination of types and strengths of adhesive layers can be used in any embodiment of the multi-purpose sticker.

Transparent Release Layer Cover Embodiments

A transparent release layer cover may be used in place of the "anti-sticker layer" (i.e., the decorative cover and its release layer backing) in any embodiment of the multi-purpose sticker. In these embodiments there would be no decorative cover, but instead the decorative element 24 (contained on either substrate 18, substrate 22, or the decorative layer 20, depending on the embodiment used) within the sticker's double-sided adhesive layer would show through both the top adhesive layer and the transparent release layer cover to create an effect similar to a decorative cover. In these embodiments the decorative element 24 can be seen at all times and will act as both the decorative element seen within the double-sided adhesive layer (either on substrate 18, substrate 22, or decorative layer 20) and will also be the decorative element seen when looking at the cover of the multi-purpose sticker. The transparent release layer cover eliminates the need for a separate decorative element on the cover as the decorative element 24 within the sticker's double-sided adhesive layer can be seen through it. The transparent release layer cover creates a displaying, almost marbleized, effect for the decorative element 24.

In addition to the embodiments previously discussed, a transparent release layer cover may be used in place of the "anti-sticker layer" within the multi-purpose sticker 10. As with other embodiments detailed previously, embodiments using a transparent release layer cover may come in the form of a single-substrate, double-substrate, or multi-substrate embodiment. These embodiments have the same overall functionality as the equivalent embodiment that uses the "anti-sticker layer" described previously. In one example use, any embodiment using the transparent release layer cover can be used as a decorative sticker to close and seal an envelope while leaving the transparent release layer cover in place on the sticker, or the transparent release layer cover may be removed to allow use of the sticker's topmost adhesive layer to attach the envelope to a gift. In general, any embodiment of the multi-purpose sticker can be used as a decorative sticker, or the cover may be removed to expose a double-sided adhesive layer which can be used to attach two items together.

FIG. 3E may be used to represent a single-substrate embodiment of the multi-purpose sticker in which a transparent release layer cover is used in place of the "anti-sticker layer" (i.e., the decorative cover with its release layer backing). In the single-substrate embodiment using the transparent release layer cover, the substrate comprises the decorative element, whereas the decorative layer displays the decorative element in the double-substrate embodiment. An example embodiment of the multi-purpose sticker 10, as shown in FIG. 3E, may comprise a substrate 18 comprising a decorative element 24, a releasable or non-releasable first adhesive layer 18' disposed on a first side of the substrate 18, and a releasable or non-releasable second adhesive layer 18" disposed on a second side of the substrate 18, wherein the decorative element 24 is visible through an adhesive layer.

The substrate 18 may be printable and may have a decorative element 24 printed onto the substrate. The decorative element may be placed directly onto the substrate 18 prior to releasable, non-releasable, or repositionable adhesive layers being applied over the substrate. The decorative element 24 may also be added to the substrate 18 using any other suitable method to add a decorative element onto the substrate. For example, if the substrate 18 comprises metal foil, the decorative element may be embossed or stamped onto the substrate, rather than being printed onto the substrate. Though the decorative element 24 will most often be placed onto the side of the substrate 18 facing the transparent release layer cover 15, as shown in FIG. 3E, the decorative element can be placed onto either side of the substrate, especially when a transparent substrate is used. The example embodiment may also comprise a transparent release layer cover 15 positioned to cover the second adhesive layer 18", the transparent release layer cover 15 having a predefined shape, wherein the transparent release layer cover 15 is in contact with the second adhesive layer 18", and wherein the decorative element 24 is visible through the transparent release layer cover 15. The transparent release layer cover 15 may be about the same size and shape of the substrate 18 and may be selectively removed to expose the second adhesive layer 18".

The example embodiment may further comprise a release layer 16 positioned to cover the first adhesive layer 18'. The release layer 16 may be larger than the substrate 18, so that the release layer may be more easily peeled away from the first adhesive layer 18'.

As is true with release layers 12' and 16, the transparent release layer cover 15 and the release layer 16 may have different surface energies, so that either layer may be designed to release from the sticker first. For example, the release layer 16 may be designed to release first, prior to the transparent release layer cover 15 releasing from the sticker. This holds true for any embodiment of the multi-purpose sticker utilizing the transparent release layer cover in place of the "anti-sticker layer" (i.e., the decorative cover with its release layer backing).

Figure 3F:
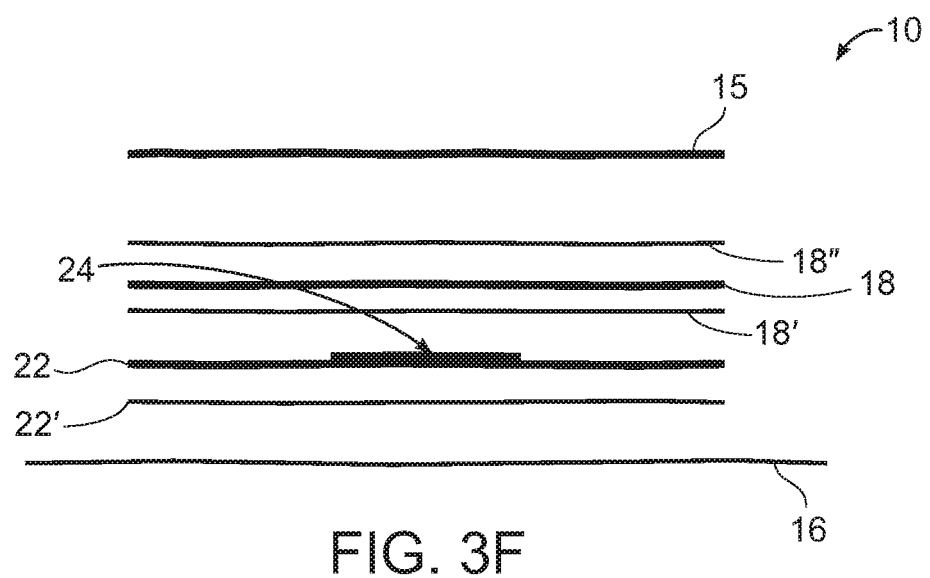
FIG. 3F is another side, exploded view of several layers of a multi-purpose sticker in accordance with an example embodiment.

In another example embodiment, as shown in FIG. 3F, the multi-purpose sticker 10 may comprise a first substrate 18, a releasable or non-releasable first adhesive layer 18' disposed on a first side of the first substrate 18, and a releasable or non-releasable second adhesive layer 18" disposed on a second side of the first substrate 18. The example embodiment may also comprise a second substrate 22 comprising a decorative element 24 and having a first side and a second side, the first side of the second substrate 22 in contact with the first adhesive layer 18', and a releasable or non-releasable third adhesive layer 22' disposed on the second side of the second substrate 22, wherein the decorative element 24 may be visible through the first substrate 18 and its adhesive layers 18' and 18".

The example embodiment may also comprise a transparent release layer cover 15 positioned to cover the second adhesive layer 18", the transparent release layer cover 15 having a predefined shape, wherein the transparent release layer cover 15 is in contact with the second adhesive layer 18", and wherein the decorative element 24 is visible through the transparent release layer cover 15. The transparent release layer cover 15 may be about the same size and shape of the first substrate 18 and may be selectively removed to expose the second adhesive layer 18".

This embodiment is similar to adding a transparent double-sided adhesive (comprising substrate 18 with its adhesive layers 18' and 18") onto a "regular sticker" (comprising substrate 22 with its adhesive layer 22' and decorative element 24), which may then be covered by the transparent release layer cover 15. The substrate 22 may be printed on, embossed, etc., to create the decorative element 24 on the substrate 22.

Figure 4C:
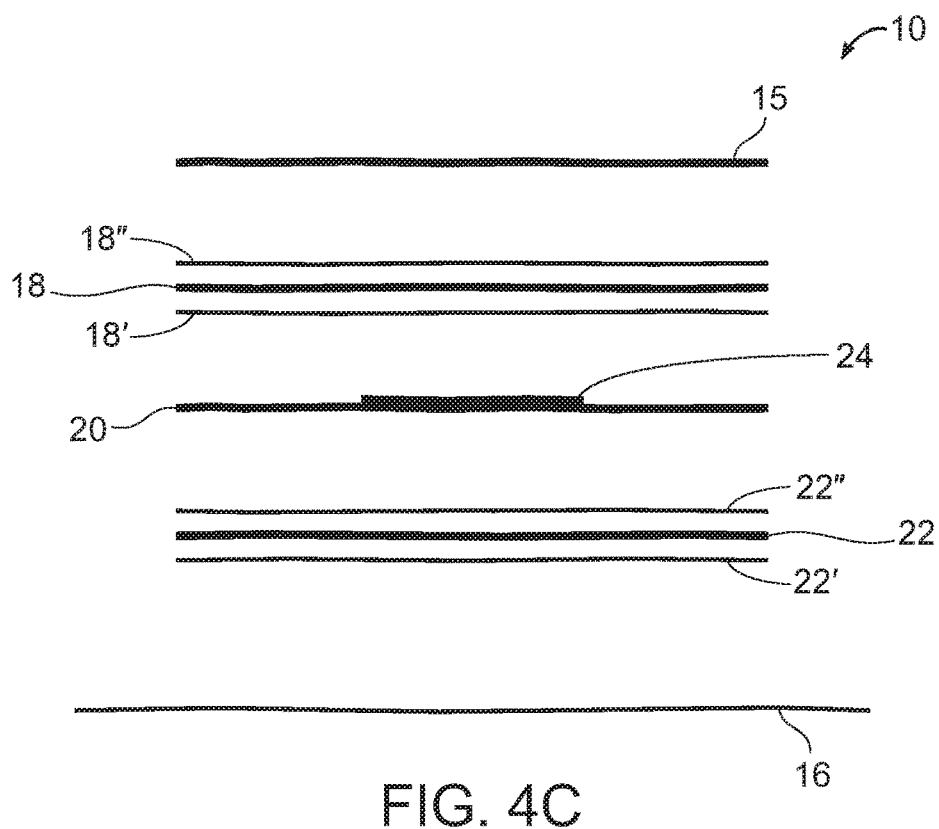
FIG. 4C is another side, exploded view of several layers of a multi-purpose sticker in accordance with an example embodiment.

Another example embodiment, as shown in FIG. 4C, for example, may represent a double-substrate embodiment of the multi-purpose sticker 10 using a transparent release layer cover 15. In addition to the first substrate 18 and its adhesive layers 18' and 18", the double-substrate embodiment includes an additional substrate layer, comprising a second substrate 22 and adhesive layers 22' and 22", one adhesive layer on either side of the second substrate 22, and also incorporates a decorative layer 20 between the substrates 18 and 22. The decorative layer 20 comprises a decorative element 24, and is visible through the transparent release layer cover 15 and transparent substrate 18 and remains visible through substrate 18 and its adhesive layers 18' and 18" even after the transparent release layer cover 15 is peeled off the sticker 10.

Such embodiments, as shown in FIG. 4C, may comprise a transparent first substrate 18, a releasable or non-releasable first adhesive layer 18' disposed on a first side of the first substrate 18, and a releasable or non-releasable second adhesive layer 18" disposed on a second side of the first substrate 18. The example embodiment may also comprise a second substrate 22 having a releasable or non-releasable adhesive layer on a first side 22' and a second side 22", wherein the second side of the second substrate 22 faces the first substrate 18.

The example embodiment may also comprise a decorative layer 20 comprising a decorative element 24, the decorative layer 20 disposed between the first substrate 18 and the second substrate 22, the decorative layer 20 adhered on a first decorative layer side to the adhesive layer 22" on the second side of the second substrate 22 and having a second decorative layer side facing the first substrate 18, the second decorative layer side being adhered to the first adhesive layer 18' of the first substrate 18, wherein the decorative element 24 is visible on the decorative layer 20 through the transparent first substrate 18, creating a displaying effect.

The example embodiment may also comprise a transparent release layer cover 15 positioned to cover the second adhesive layer 18" of the first substrate 18, the transparent release layer cover 15 having a predefined shape, wherein the transparent release layer cover 15 is in contact with the second adhesive layer 18" of the first substrate 18, and wherein the decorative element 24 is visible through the transparent release layer cover 15. The transparent release layer cover 15 may be about the same size and shape of the first substrate 18 and may be selectively removed to expose the second adhesive layer 18" of the first substrate 18.

As previously stated, decorative element 24 may be or include printing or an embossed design, or both, or any other suitable method may be used to place a decorative element onto either substrate 18, substrate 22, or decorative layer 20, depending on the embodiment used. For example, the decorative element 24 may have a printed design that is in register with an embossed design. Using a transparent release layer cover 15 allows the decorative element 24 to be seen whether or not the double-sided adhesive layer of the sticker is used. This allows for the decorative element 24 to display an advertising image such as a company name, a company logo, a company slogan, information, a message, picture, or drawing, or any design desired at all times within the sticker's double-sided adhesive layer, on either substrate 18, substrate 22, or decorative layer 20, depending on the embodiment used.

Figure 11:
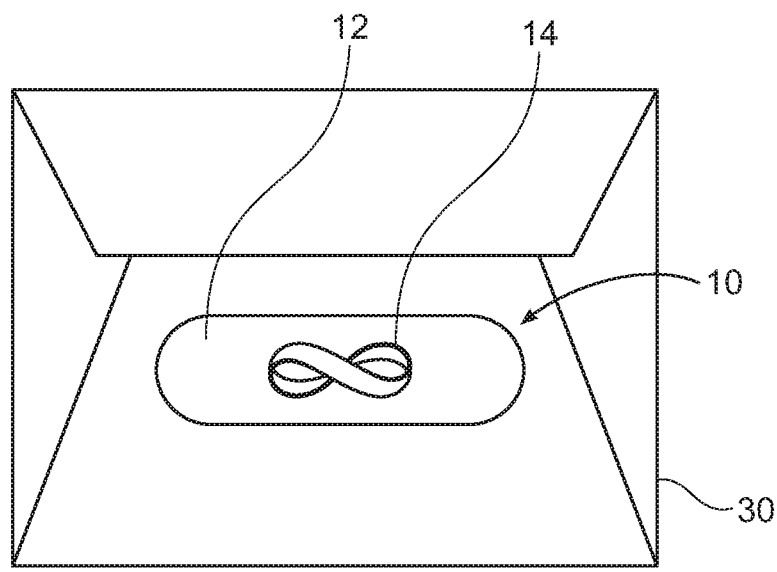
FIG. 11 is a top view of a multi-purpose sticker placed on an envelope in accordance with an example embodiment.

A release layer 16 may be positioned to cover the bottommost adhesive layer in any embodiment of the multi-purpose sticker 10 and can be seen, for example, in FIGS. 3 and 4. Release layer 16 may be larger than the sticker's bottommost substrate and acts to protect the multi-purpose sticker 10 until use by a consumer or user. As mentioned previously, though in general the multi-purpose sticker 10 will come already placed on release layer 16, any embodiment of the multi-purpose sticker 10 may also come already placed onto an envelope or other device to allow them the features contained within the multi-purpose sticker. For example, any embodiment of the multi-purpose sticker 10 may exclude release layer 16 and may come already placed on an envelope, as shown in FIG. 11.

As mentioned previously, the embodiments of the multi-purpose sticker that use the transparent release layer cover function in the same way as the other embodiments of the multi-purpose sticker previously described that use the "anti-sticker layer" (i.e., the decorative cover with its release layer backing). In general, any embodiment of the multi-purpose sticker 10 may be used as a decorative sticker or may have its cover removed to allow access to a double-sided adhesive layer underneath. However, some embodiments may also have more functions depending on the types, strengths, and order of the adhesive layers used within the embodiment, as discussed previously. Any of the adhesive layers within any embodiment of the multi-purpose sticker 10 may be made of any type and strength of releasable (i.e., removable or repositionable) or non-releasable (i.e., permanent) pressure-sensitive adhesive, and any embodiment may use any combination of these adhesive layers within it. For example, the double-substrate embodiment described here and represented by FIG. 4C may have multiple functions depending on the combination of adhesive layers used within the embodiment. For more information on functions and materials used within these embodiments, please review the embodiments previously described that use the "anti-sticker layer".

As previously discussed, using a transparent release layer cover allows the decorative element 24 (contained on either substrate 18, substrate 22, or decorative layer 20, depending on the embodiment used) to be seen whether or not the transparent release layer cover is removed. In these embodiments, the decorative element 24 can be seen at all times, either through the transparent release layer cover and the top adhesive layer if no adhesive layer is needed, or through only the adhesive layer if the transparent release layer cover is removed to allow use of the adhesive layer. Since the decorative element 24 is visible at all times in these embodiments, when a transparent release layer cover is used it is not necessary to have a decorative cover. Instead, the decorative element 24 can function as both the decorative element seen within the sticker's double-sided adhesive layer and the decorative element that will be seen when looking at the transparent release layer cover.

As stated earlier, a transparent release layer cover may replace the "anti-sticker layer" (i.e., the decorative cover and its release layer backing) in any embodiment of the multi-purpose sticker and is not limited to the construction listed in the example embodiments described here.

Figure 3G:
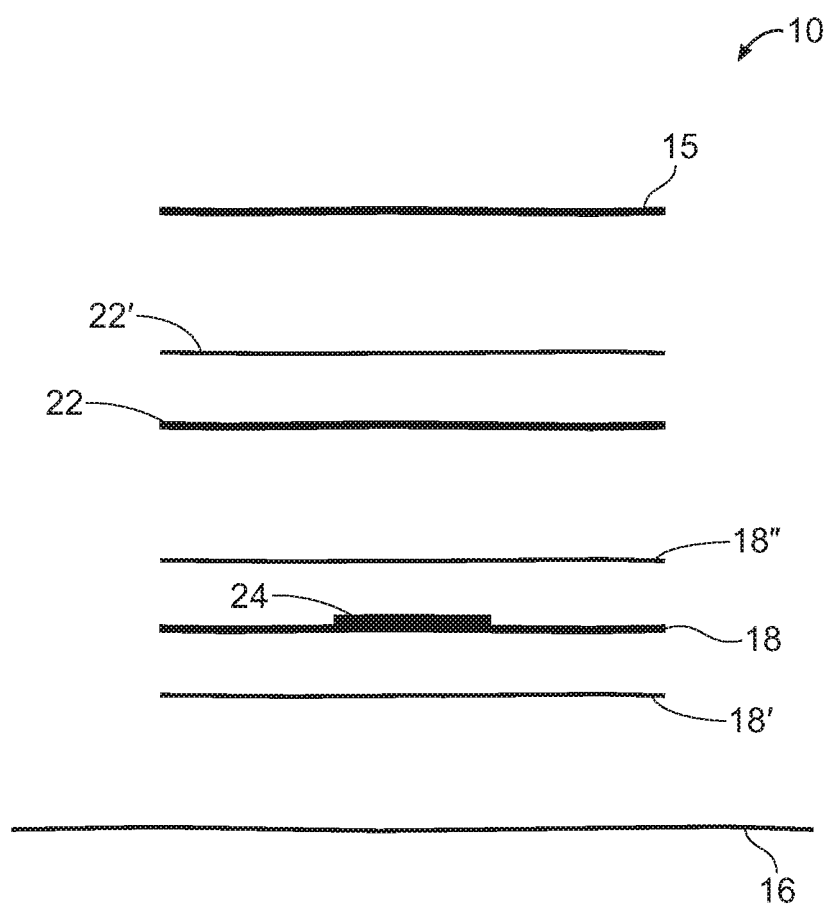
FIG. 3G is another side, exploded view of several layers of a multi-purpose sticker in accordance with an example embodiment.
Figure 4D:
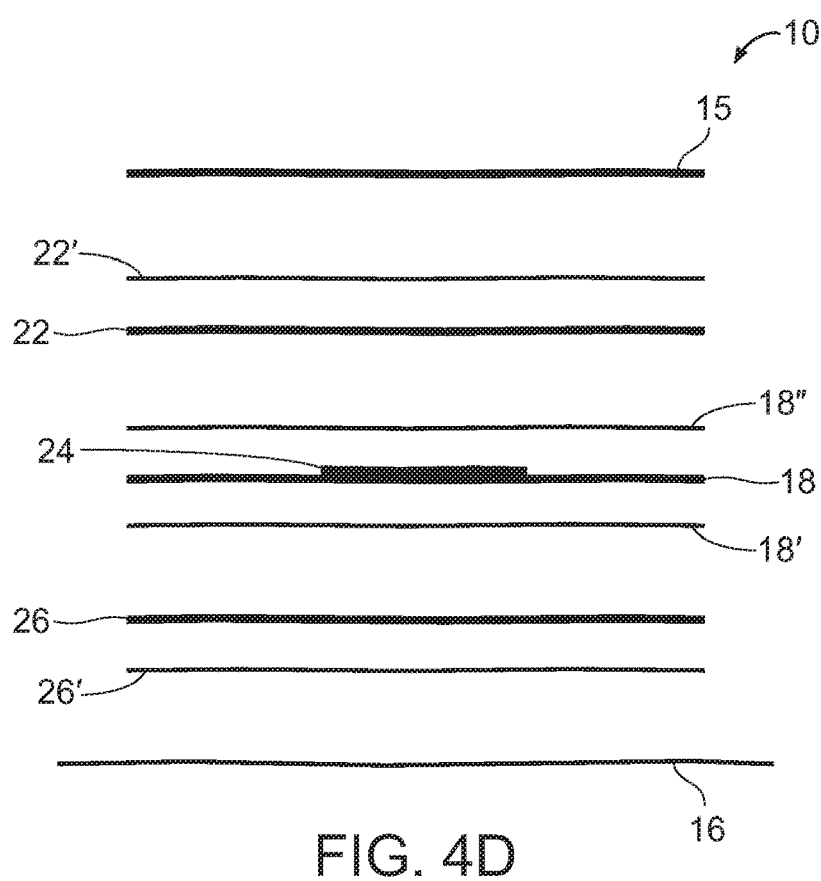
FIG. 4D is another side, exploded view of several layers of a multi-purpose sticker in accordance with an example embodiment.

Though previously described, the multi-purpose sticker embodiments shown in FIGS. 3F and 4C can be described another way, as extensions of the embodiment shown in FIG. 3E. These embodiments of the multi-purpose sticker would use the structure of the embodiment shown in FIG. 3E and add layers to it to create the embodiments shown in FIGS. 3G and 4D. The embodiments shown in FIGS. 3G and 4D are equivalent to the embodiments shown in FIGS. 3F and 4C. The descriptions of the embodiments shown in FIGS. 3G and 4D define the same overall structure and layers of the embodiments described previously and shown in FIGS. 3F and 4C.

The following descriptions detail the embodiments shown in FIGS. 3G and 4D. These embodiments use the embodiment shown in FIG. 3E and build from it to create the embodiments shown in FIGS. 3G and 4D. The following descriptions are also another way to describe the embodiments shown in FIGS. 3F and 4C. The embodiment of the multi-purpose sticker shown in FIG. 3F is equivalent to the embodiment shown in FIG. 3G, as once the layers of each embodiment are pieced together, they result in the same overall structure and function in the same way. The descriptions provided for FIGS. 3F and 3G are just different ways to describe the same multi-purpose sticker. The same is true of the embodiments shown in FIGS. 4C and 4D, as they too are equivalent and will result in the same overall structure and function in the same way as each other once pieced together. The descriptions provided for FIGS. 4C and 4D are also different ways to describe the same multi-purpose sticker.

As previously described and shown in FIG. 3E, an example embodiment of the multi-purpose sticker may comprise a substrate 18 comprising a decorative element 24, a releasable or non-releasable first adhesive layer 18' disposed on a first side of the substrate 18, and a releasable or non-releasable second adhesive layer 18" disposed on a second side of the substrate 18, wherein the decorative element 24 is visible through an adhesive layer.

This example embodiment may also comprise a transparent release layer cover 15 positioned to cover the second adhesive layer 18", wherein the decorative element 24 is visible through the transparent release layer cover 15, and wherein the transparent release layer cover 15 may be about the same size and shape of the substrate 18 and may be selectively removed from the sticker.

Another example embodiment of the multi-purpose sticker, as shown in FIG. 3G, may take the embodiment shown in FIG. 3E and add layers to it to create the embodiment shown in FIG. 3G. For example, the example embodiment described above, and shown in FIG. 3E, may further comprise a transparent second substrate 22, the second substrate 22 having a first side and a second side, and a releasable or non-releasable third adhesive layer 22' disposed on the second side of the second substrate 22. The second substrate 22 may be disposed between the first substrate 18 and the transparent release layer cover 15, the first side of the second substrate 22 in contact with the second adhesive layer 18" of the first substrate 18, wherein the transparent release layer cover 15 is in contact with the third adhesive layer 22'. In this embodiment the decorative element 24 is visible through the transparent release layer cover 15 and the transparent second substrate 22.

Another example embodiment of the multi-purpose sticker, as shown in FIG. 4D, may take the embodiment shown in FIG. 3G and may incorporate other layers to create the embodiment shown in FIG. 4D. For example, to form the example embodiment shown in FIG. 4D, the example embodiment described above, and shown in FIG. 3G, may further comprise a third substrate 26, the third substrate 26 having a first side and a second side, and a releasable or non-releasable fourth adhesive layer 26' disposed on the first side of the third substrate 26, wherein the second side of the third substrate 26 is in contact with the first adhesive layer 18' of the first substrate 18. The example embodiment shown in FIG. 4D is an example of a multi-substrate version of the multi-purpose sticker.

As with other embodiments of the multi-purpose sticker, any of the embodiments described here may further comprise a release layer 16 positioned to cover the sticker's bottommost adhesive layer. The release layer 16 may be larger than the remaining layers of the sticker and acts to protect the multi-purpose sticker until use by a consumer or user. Also, as with other embodiments, though these embodiments will generally come already placed on release layer 16, they may also come already placed onto an envelope or other device.

As stated previously, the embodiments shown in FIGS. 3G and 4D are equivalent to the embodiments shown in FIGS. 3F and 4C. When fully formed, the embodiments of FIGS. 3F and 3G will result in the same sticker. The same is true for the embodiments shown in FIGS. 4C and 4D, as they also result in the same sticker when fully formed. The substrate 18 shown in FIG. 4D is equivalent to the decorative layer 20 shown in FIG. 4C, as both comprise the decorative element 24 within their respective embodiments. In the description of the embodiment shown in FIG. 4D, the substrate 18 comprises the decorative element and would serve in place of the decorative layer 20 from the previous description of the embodiment shown in FIG. 4C. The equivalent embodiments may function in the same way as each other and may be designed to separate between layers if desired. The embodiments may have multiple functions if designed to separate between layers, as previously described. The multi-purpose sticker shown in FIG. 4D is equivalent to the embodiment shown in FIG. 4C, and both result in the same sticker when fully formed.

The only differences between the embodiments shown in FIGS. 3G and 4D and those shown in FIGS. 3F and 4C are the way the embodiments are described and the way the drawings are labeled. Once the stickers are formed, they result in the same sticker. These are just a few examples of how different descriptions can be used to describe the same multi-purpose sticker.

The multi-purpose sticker is capable of other embodiments and of being practiced and carried out in various ways. The descriptions in this section are an example of how the embodiments of the multi-purpose sticker may be described and carried out in various ways, and yet result in the same sticker. The embodiments shown in FIGS. 3F and 3G are equivalent to each other and result in the same sticker once the layers are pieced together. This is also true of the embodiments shown in FIGS. 4C and 4D. The equivalent embodiments described here result in the same sticker and function in the same way as those embodiments previously described. These descriptions are an example of how the multi-purpose sticker embodiments may be described in different terms, while still describing the same embodiment structures.

As stated previously, the transparent release layer cover and the "anti-sticker layer" (i.e., the decorative cover with its release layer backing) are interchangeable, and any embodiment of the multi-purpose sticker may use either the "anti-sticker layer" or the transparent release layer cover. Any embodiment described previously using the "anti-sticker layer", but not mentioned in this section, may use the transparent release layer cover in place of the "anti-sticker layer". The same holds true for the embodiments described here, as any embodiment described in this section may also use the "anti-sticker layer" in place of the transparent release layer cover.

Multi-Purpose Sticker and Other Devices

As stated previously, though in general the multi-purpose sticker will come already placed on a release layer, any embodiment of the multi-purpose sticker (including, but not limited to, all embodiments using a decorative cover and all embodiments using a transparent release layer cover) may also come already placed onto an envelope or other device to allow them the features contained within the multi-purpose sticker. For example, any embodiment of the multi-purpose sticker 10 may exclude release layer 16 and may come already placed on a greeting card envelope 30, as shown in FIG. 11. For simplicity, our discussion below will focus on the multi-purpose sticker coming already placed onto a greeting card envelope, though these discussions may apply to any device that comes with the multi-purpose sticker attached.

As stated above, any embodiment of the multi-purpose sticker may come already placed onto an envelope or other device. For example, a single-substrate embodiment of the multi-purpose sticker, consisting of a transparent double-sided adhesive layer (i.e., substrate 18 and adhesive layers 18' and 18") and a decorative cover 12 with its release layer backing 12', may come already placed onto a greeting card envelope, as shown in FIG. 11, with adhesive layer 18' adhering the multi-purpose sticker to the envelope. As stated previously, substrate 18 may come as a transparent substrate with no decorative element placed on it, as is the case in this example. With this embodiment of the multi-purpose sticker coming already placed onto a greeting card envelope, the sticker will offer decoration to the envelope through its decorative cover and will also provide a way to attach the envelope to a gift through its double-sided adhesive layer when desired. In this example, the envelope may be given away without need of the sticker's adhesive layer, in this case the decorative cover 12 will remain in place on the sticker, as shown in FIG. 11, camouflaging the double-sided adhesive layer underneath, and the recipient of the envelope will see the sticker only as decoration for the envelope and may not even realize there is an adhesive layer present on the envelope. If instead the user wishes to attach the envelope to a gift, they will simply peel the decorative cover 12 from the multi-purpose sticker to expose the double-sided adhesive layer underneath. At this point, the sticker may not be highly visible and will show as only a transparent double-sided adhesive layer (i.e., substrate 18 and adhesive layers 18' and 18") with adhesive layer 18' attached to the envelope. The user may then press the envelope onto the gift using adhesive layer 18" of the multi-purpose sticker to attach the envelope to the gift, as shown in FIG. 9.

Figure 12:
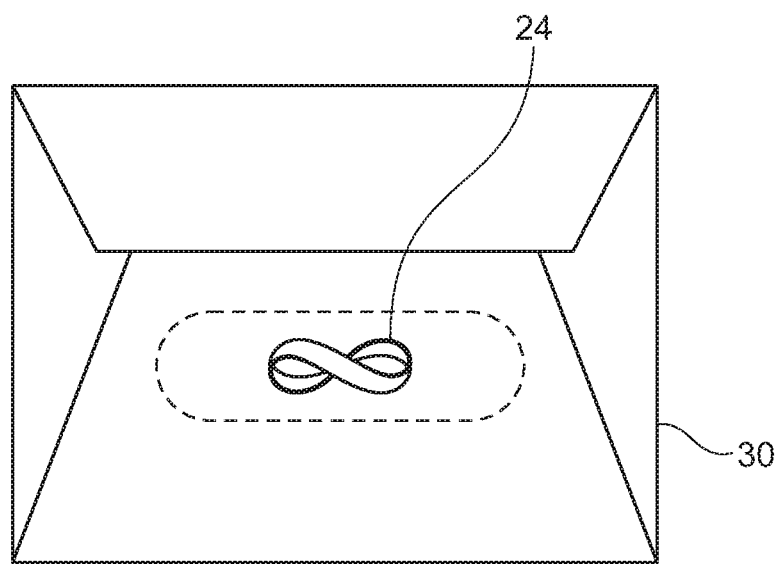
FIG. 12 is another top view of a multi-purpose sticker placed on an envelope, with an adhesive layer exposed and a decorative element visible, in accordance with an example embodiment.

In another example, a multi-purpose sticker containing decorative element 24 (either on substrate 18, substrate 22, or decorative layer 20, depending on the embodiment used) may come already placed onto an envelope. For example, a double-substrate embodiment of the multi-purpose sticker, as shown in FIG. 4A, may include substrates 18 and 22 with their associated adhesive layers, a decorative layer 20 with decorative element 24 placed on it and disposed between the two substrates, and a decorative cover 12 with its release layer backing 12'. This double-substrate embodiment may come already placed on an envelope with adhesive layer 22' attaching the sticker to the envelope. This embodiment may function similar to a single-substrate embodiment of the multi-purpose sticker, but when the decorative cover 12 is removed the decorative layer 20 and decorative element 24 will be visible on the envelope within the sticker's double-sided adhesive layer, as shown in FIG. 12. Using this embodiment of the multi-purpose sticker provides two decorative layers to the envelope and will allow a decorative or informational element to be seen whether or not the double-sided adhesive layer of the sticker is used. If no adhesive layer is needed, the recipient of the envelope will see the sticker's decorative cover 12 with decorative element 14 still in place on the envelope, as shown in FIG. 11. If the sticker's double-sided adhesive layer is used to attach the envelope to a gift, the recipient of the envelope will see the decorative layer 20 with decorative element 24 once they peel the envelope from the gift and the sticker becomes visible on the envelope once more.

In another example, an embodiment of the multi-purpose sticker that uses a transparent release layer cover, as shown in FIG. 4C, may come already placed onto an envelope. When using this embodiment, as shown in FIG. 12, the decorative layer 20 and decorative element 24 will be seen at all times on the envelope, either through the transparent release layer cover 15 and transparent substrate 18 or through just substrate 18 and its adhesive layers 18' and 18" when the cover 15 is removed and the sticker's double-sided adhesive layer is used.

Figure 10:
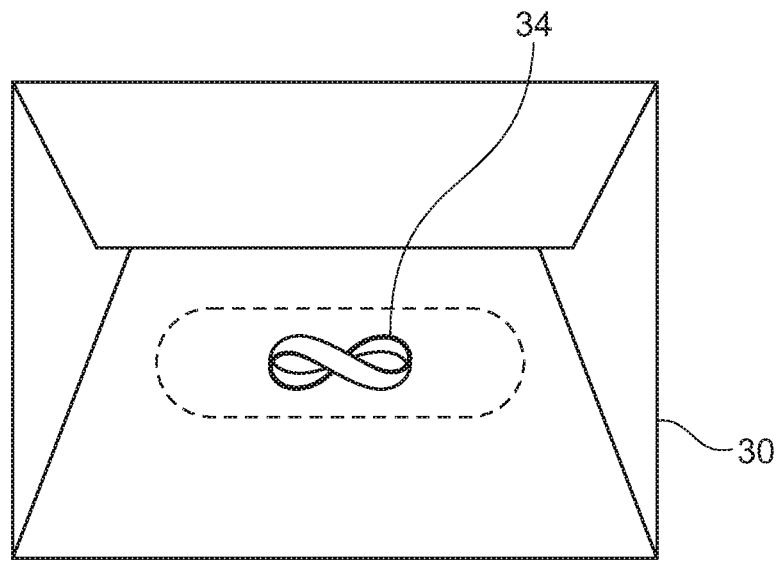
FIG. 10 is a back view of an envelope with a decorative element visible, in accordance with an example embodiment.

In yet another example, a single-substrate embodiment of the multi-purpose sticker may be used in conjunction with an envelope that already has a decorative element placed on it to create an effect similar to using an embodiment of the multi-purpose sticker that comprises a decorative element 24. For example, a decorative element 34 may be printed or embossed directly onto an envelope or a decorative layer containing decorative element 34 may be formed from a separate material and then bonded or adhered onto an envelope. A single-substrate embodiment of the multi-purpose sticker using a transparent substrate 18, without the optional decorative element 24, may then be placed onto the envelope and completely cover the decorative element 34 already on the envelope. This would allow a similar appearance and function as using an embodiment of the multi-purpose sticker that comprises a decorative element 24, with a decorative cover present from the sticker and the envelope's decorative element 34 visible through the sticker's transparent double-sided adhesive layer when the sticker's cover has been removed, as shown in FIG. 10.

In addition, any embodiment of the sticker 10 may comprise transparent layers, so that decorative elements beneath the sticker can be seen. For example, as shown in FIG. 10, an envelope may include a decorative element 34 on it, comprising any pattern, and placed on the envelope using any technique that creates a visible decorative or informational element. FIG. 10 also shows, in outline, where a sticker 10 could be placed, so as to cover the decorative element 34. This also represents the appearance of the envelope with a sticker 10 in place, after the sticker's decorative cover has been removed, in the event that the internal layers of the sticker 10 are transparent.

FIG. 11 illustrates an envelope with a multi-purpose sticker 10 and decorative cover 12 in place. Although the decorative element 14 in FIG. 11 has the same design as decorative element 34, it should be noted that the designs may be different, and that the decorative elements on either the sticker or the envelope may comprise printing, embossing, stamping, etc. These decorative elements allow for advertising images such as company logos, messages, pictures, drawings, text, information, etc., to be displayed on either the sticker or the envelope. As also illustrated by FIGS. 10-12, the sticker 10 may be any of various shapes, and may be placed in different locations on an envelope or other object.

These are just a few examples of different embodiments of the multi-purpose sticker coming already placed on an envelope, as stated previously, any embodiment of the multi-purpose sticker may come already placed onto an envelope or other device and is not limited to the embodiments described here. The multi-purpose sticker may be cut into any shape or design and may be placed in any location and in any orientation on the envelope or device it comes on. The multi-purpose sticker offers any device it comes on all the features and functions associated with the embodiment used. For example, the double-substrate embodiment may offer more functions to the envelope than have been described here, depending on the types and order of adhesive layers used within the embodiment, as described previously.

In general, the multi-purpose sticker provides an esthetic way to hide an adhesive layer on an envelope (or other device) and eliminates the need for outside products, such as tape, to be able to attach the envelope to a gift. As shown in FIG. 11, a multi-purpose sticker 10 may come already attached to an envelope 30. The decorative cover 12 of the sticker provides a place to advertise or provide decoration for the envelope and camouflages the double-sided adhesive layer underneath. The user has the option of giving away the envelope (containing a greeting card, etc.) as a regular envelope, with the sticker's decorative cover 12 and decorative element 14 providing decoration for the envelope. If given away without need of the adhesive layer, the decorative cover 12 will remain in place on the sticker and the envelope will appear as just an envelope with a decoration on it, and the recipient may not even know there is an adhesive layer present on the envelope as it will be camouflaged by the decorative cover 12.

The user also has the option of peeling the decorative cover 12 off the multi-purpose sticker to access the double-sided adhesive layer underneath. Once the cover of the sticker has been removed, the double-sided adhesive layer will become visible on the envelope. If the embodiment used contains no decorative element 24, the double-sided adhesive layer may not be highly visible on the envelope if transparent. If the embodiment used does contain a decorative element 24, the decorative element 24 will be visible within the double-sided adhesive layer on the envelope. If the embodiment of the sticker used contains a transparent double-sided adhesive layer, but is placed over a decorative element 34 that has already been placed onto or attached to the envelope 30, as shown in FIG. 10, then the decorative element 34 will be seen through the transparent double-sided adhesive layer and appear similar to embodiments that include a decorative element 24 within the double-sided adhesive layer. The double-sided adhesive layer can then be used to attach the envelope (or other device) to a gift, etc. Using an embodiment of the multi-purpose sticker that includes a decorative element 24 to attach the envelope to a gift allows the recipient of the envelope to see the decorative element 24 after they peel the envelope from the gift, as shown in FIG. 12.

Depending on the embodiment used, the multi-purpose sticker provides any device it comes on up to two layers containing decorative elements. As stated previously, these decorative elements may be used for decoration, providing information, or advertising, and may display a company name, a company logo, a company slogan, a message, a picture, a drawing, text, information, or any design desired, etc. For example, a double-substrate embodiment of the multi-purpose sticker may offer two layers containing decorative elements (i.e., the decorative cover 12 and the decorative layer 20). The decorative cover 12 and the decorative layer 20 may show similar decorative elements, or the decorative elements may differ from one another. For example, the decorative elements used for the decorative cover 12 and the decorative layer 20 may match and both show a company logo, or they may differ with the decorative cover 12 showing an occasion themed exclamation, such as "Happy Holidays!", and the decorative layer 20 showing an occasion themed message, such as "Wishing you and your loved ones the best this holiday season!".

Decorative Double-Sided Adhesive Embodiment

As stated previously, the multi-purpose sticker may comprise up to 3 main layers which may comprise multiple layers themselves, such as a substrate with an adhesive layer on either side, etc. One of these 3 main layers is the multi-purpose sticker's double-sided adhesive layer. The double-sided adhesive layer may sometimes be referred to as the decorative double-sided adhesive layer when the double-sided adhesive layer contains a decorative element within it. In its most stripped-down or basic form, the multi-purpose sticker may come in the form of just its decorative double-sided adhesive layer. Along with being used within the multi-purpose sticker, the decorative double-sided adhesive may also be fabricated to function independently, similar to other typical double-sided adhesives or tapes. Though, unlike other double-sided adhesives or tapes, the decorative double-sided adhesive serves more than one function. First, the decorative double-sided adhesive allows a consumer or user the ability to adhere, or stick, two objects together, and second, it also provides a decorative element that allows for advertising, a design, text, information, etc., to be displayed within the double-sided adhesive itself. The decorative double-sided adhesive has an advantage over normal double-sided adhesives or tapes by offering a decorative feature within it. For example, information such as instructions describing how to use the adhesive layer, a fun design or message, or a company logo, etc., may be displayed within the decorative double-sided adhesive.

The decorative double-sided adhesive may be fabricated in multiple ways and may come in a single-substrate, double-substrate, or multi-substrate form as described previously. For example, a single-substrate embodiment of the decorative double-sided adhesive, as shown within FIGS. 3A, 3D, and 3E, may generally comprise a substrate 18 comprising a decorative element 24, a first adhesive layer 18' disposed on a first side of the substrate 18, and a second adhesive layer 18" disposed on a second side of the substrate 18. In this embodiment, the decorative element 24 is visible on the substrate 18 through an adhesive layer. The decorative element 24 may be placed directly onto the substrate 18 prior to the releasable (i.e., removable or repositionable) or non-releasable (i.e., permanent) adhesive layers being applied over the substrate. The substrate in this example embodiment may comprise a printable substrate, or may comprise film, foil, metal, metal foil, paper, plastic, plastic membrane, vinyl, wood, or any other suitable material. The substrate may be transparent or opaque (i.e., non-transparent). When a transparent substrate is used within this embodiment, the decorative element 24 may be visible on the substrate 18 from either side of the transparent substrate 18 and may be seen through either adhesive layer 18' or 18".

Another example embodiment of the decorative double-sided adhesive, as shown within FIGS. 3B and 3F, may generally comprise a first substrate 18, a first adhesive layer 18' disposed on a first side of the first substrate 18, a second adhesive layer 18" disposed on a second side of the first substrate 18, a second substrate 22 comprising a decorative element 24 and having a first side and a second side, the first side of the second substrate 22 in contact with the first adhesive layer 18' of the first substrate 18, and a third adhesive layer 22' disposed on the second side of the second substrate 22. In this embodiment, the decorative element 24 may be visible on the second substrate 22 through the first substrate 18 and its adhesive layers 18' and 18". This embodiment is similar to adding a transparent double-sided adhesive (comprising substrate 18 with its adhesive layers 18' and 18") onto a "regular sticker" (comprising substrate 22 with its adhesive layer 22' and decorative element 24).

In yet another example embodiment, as shown within FIGS. 4A-C, a double-substrate embodiment of the decorative double-sided adhesive may generally comprise a first substrate 18, a first adhesive layer 18' disposed on a first side of the first substrate 18, a second adhesive layer 18" disposed on a second side of the first substrate 18, a second substrate 22 having an adhesive layer on a first side 22' and a second side 22", the second side of the second substrate 22 facing the first substrate 18, and a decorative layer 20 comprising a decorative element 24, the decorative layer 20 disposed between the first substrate 18 and the second substrate 22, the decorative layer 20 adhered on a first decorative layer side to the adhesive layer 22" on the second side of the second substrate 22 and having a second decorative layer side facing the first substrate 18, the second decorative layer side being adhered to the first adhesive layer 18' of the first substrate 18. In this embodiment, the decorative element 24 may be visible on the decorative layer 20 through the first substrate 18 and its adhesive layers 18' and 18".

In the decorative double-sided adhesive, the layer containing the decorative element (i.e., substrate 18, substrate 22, or decorative layer 20, depending on the embodiment used) may be made of or comprise film, foil, metal, metal foil, paper, plastic, plastic membrane, vinyl, wood, or virtually any other suitable material, and may be transparent or opaque (i.e., non-transparent). The layer containing the decorative element may be printable. The decorative element used in any embodiment of the decorative double-sided adhesive may comprise printing, an embossed design, a stamped design, or any other suitable method may be used to place a decorative element onto either substrate 18, substrate 22, or decorative layer 20, depending on the embodiment used. It is also possible to use multiple techniques in conjunction with one another for the decorative element. For example, the decorative element 24 may have a printed design that is in register with an embossed design. The decorative element allows for an advertising image, a fun design, text, information, etc., to be displayed within the decorative double-sided adhesive, and may comprise a company name, logo, slogan, a message, picture, drawing, instructions, information, or any design desired, etc. For example, a company may choose to advertise by placing their brand name or logo within the decorative double-sided adhesive.

Any substrate described herein may be a transparent, synthetic polymeric material, such as polypropylene or polyester film, although any of the substrates may also be non-transparent, printable, etc. When a transparent layer is used for the layer containing the decorative element, then the decorative element may be seen from either side of the decorative double-sided adhesive. If a transparent substrate comprising a decorative element is used in the single-substrate embodiment, then the decorative element 24 may be seen on the transparent substrate 18 through either adhesive layer 18' or 18" on either side of the substrate. When a transparent decorative layer is used with a decorative element in the double-substrate embodiment, then the decorative element 24 may be seen on the transparent decorative layer 20 through either substrate 18 or 22 on either side of the decorative layer 20.

As stated previously, any of the adhesive layers within any embodiment of the decorative double-sided adhesive may be made of any type and strength of non-releasable (i.e., permanent) or releasable (i.e., removable or repositionable) pressure-sensitive adhesive, and any embodiment may use any combination of these adhesive layers within it. For example, an embodiment may use only non-releasable adhesive for its adhesive layers and be used to permanently adhere two items together. In another example, the single-substrate embodiment may use a non-releasable adhesive on one side of the substrate and a releasable adhesive on the other side. This could be used to attach an envelope to a gift and the releasable adhesive would allow the recipient to peel the envelope from the gift and expose the decorative element within the decorative double-sided adhesive. As also stated previously, and further detailed when describing the double-sided adhesive layer of the multi-purpose sticker, the double-substrate embodiment of the decorative double-sided adhesive may use any combination of non-releasable or releasable adhesives for adhesive layers 18', 18", 22', and 22", and may have multiple functions depending on the combination of adhesive layers used within the embodiment.

All embodiments of the decorative double-sided adhesive may function in the same way as each other, and in the same way as previously described in the application when discussing the double-sided adhesive layer of the multi-purpose sticker. In general, the decorative double-sided adhesive functions by allowing a consumer or user the ability to adhere, or stick, two objects together, and also provides a decorative element within the double-sided adhesive itself that can be used for advertising, etc. As discussed previously, the double-substrate embodiment of the decorative double-sided adhesive may have more functions depending on the types, strengths, and order of adhesive layers used within the embodiment.

As stated previously, the multi-purpose sticker or any of its layers may be cut into any shape and size. This includes the decorative double-sided adhesive layer. For example, the decorative double-sided adhesive may be cut into any shape and size to be used with the "anti-sticker layer" (i.e., the decorative cover with its release layer backing) or the transparent release layer cover within the multi-purpose sticker. The decorative double-sided adhesive may also function independent of the multi-purpose sticker and may be cut into any shape, design, or size. The decorative double-sided adhesive may come with release layers on one or both sides. For example, the decorative double-sided adhesive may be cut into and packaged as individual decorative double-sided adhesive stickers and may use either generic release layers or transparent release layers on either side of the decorative double-sided adhesive stickers. Using transparent release layers (i.e., release liners) on both sides of the decorative double-sided adhesive stickers allows the user to see the decorative element within the sticker prior to use. Any embodiment of the decorative double-sided adhesive may also be cut into sheets or strips of varying length, such as a double-sided adhesive or tape strip, and may come packaged as a roll of decorative double-sided adhesive or tape.

The decorative double-sided adhesive may come as a roll of decorative double-sided adhesive or tape and may come packaged using a double-sided tape dispenser. It may also come in the form of a decorative double-sided adhesive roll using one double-sided release layer, as a decorative double-sided adhesive sheet or roll using two release layers with one on either side of the double-sided adhesive, etc., or any other standard method that can be used to package, protect, transport, or dispense double-sided adhesives or tapes may also be used with the decorative double-sided adhesive.

As previously mentioned, any embodiment of the decorative double-sided adhesive, described in this section or previously in the application, may be used with either the "anti-sticker layer" (i.e., the decorative cover with its release layer backing) or the transparent release layer cover to form the multi-purpose sticker, or the embodiments of the decorative double-sided adhesive may function on their own as the most stripped-down, or basic, form of the multi-purpose sticker. The decorative double-sided adhesive may be cut into any shape and size and may come packaged using any standard method to transport, protect, or dispense a double-sided adhesive or tape. The decorative double-sided adhesive may be fabricated in multiple ways. The embodiments of the decorative double-sided adhesive described in this section are not a comprehensive list and are in no way limiting. Any details previously mentioned when describing the double-sided adhesive layer of the multi-purpose sticker, but not contained within this section, may also apply to the decorative double-sided adhesive.

Unless otherwise defined, all technical and scientific terms used herein have the same meaning as commonly understood by one of ordinary skill in the art to which this invention belongs. Although methods and materials similar to or equivalent to those described herein can be used in the practice or testing of the multi-purpose sticker, suitable methods and materials are described above. All publications, patent applications, patents, and other references mentioned herein are incorporated by reference in their entirety to the extent allowed by applicable law and regulations. The multi-purpose sticker may be embodied in other specific forms without departing from the spirit or essential attributes thereof, and it is therefore desired that the present embodiments be considered in all respects as illustrative and not restrictive. Any headings utilized within the description are for convenience only and have no legal or limiting effect.

What is claimed is:

1. A multi-purpose sticker, comprising:
a substrate;

a non-releasable first adhesive layer disposed on a first side of the substrate, usable to non-releasably adhere the multi-purpose sticker to a first object;

a second adhesive layer disposed on a second side of the substrate;

a first release layer in contact with the second adhesive layer; and a decorative cover comprising the first release layer and having a first side and a second side, and a first decorative element visible from the second side, the first side releasably covering the second adhesive layer such that, when the decorative cover is removed, the second adhesive layer is usable to adhere the multi-purpose sticker to a second object, such that the multi-purpose sticker adheres the first object to the second object; and a second decorative element on the substrate, wherein the second decorative element is visible when the decorative cover is selectively removed;

wherein the decorative cover is about the same size and shape of the substrate, and entirely covers the substrate, and wherein the decorative cover can be selectively removed to expose the second adhesive layer.

2. A multi-purpose sticker, comprising:

a first substrate comprising a decorative element;

a first adhesive layer disposed on a first side of the first substrate;

a releasable second adhesive layer disposed on a second side of the first substrate;

a transparent second substrate, the transparent second substrate having a first side and a second side;

a third adhesive layer disposed on the second side of the transparent second substrate;

wherein the first side of the second substrate is in contact with the second adhesive layer of the first substrate, such that the multi-purpose sticker can be separated between the releasable second adhesive layer and the first substrate;

wherein the decorative element is visible through the transparent second substrate;

a third substrate, the third substrate having a first side and a second side; and a fourth adhesive layer disposed on the first side of the third substrate;

wherein the second side of the third substrate is in contact with the first adhesive layer of the first substrate, and wherein the first adhesive layer of the first substrate comprises a releasable adhesive, such that the multi-purpose sticker can be separated between the first adhesive layer and the first substrate.

3. A multi-purpose sticker, comprising:

a first substrate comprising a decorative element;

a first adhesive layer disposed on a first side of the first substrate; and a second adhesive layer disposed on a second side of the first substrate;

a transparent release layer cover positioned to cover the second adhesive layer wherein the decorative element is visible through the transparent release layer cover;

wherein the transparent release layer cover is about the same size and shape of the substrate, and wherein the transparent release layer cover can be selectively removed from the multi-purpose sticker such that the multi-purpose sticker is usable to adhere a first object to a second object using the adhesive layers;

a transparent second substrate, the second substrate having a first side and a second side; and a third adhesive layer disposed on the second side of the second substrate;

wherein the second substrate is disposed between the first substrate and the transparent release layer cover;

wherein the first side of the second substrate is in contact with the second adhesive layer of the first substrate;

wherein the transparent release layer cover is in contact with the third adhesive layer;

wherein the second adhesive layer comprises a releasable adhesive, such that the multi-purpose sticker can be separated between the second adhesive layer and the first substrate;

a third substrate, the third substrate having a first side and a second side; and a fourth adhesive layer disposed on the first side of the third substrate;

wherein the second side of the third substrate is in contact with the first adhesive layer of the first substrate;

wherein the first adhesive layer comprises a releasable adhesive, such that the multi-purpose sticker can be separated between the first adhesive layer and the first substrate.

4. A multi-purpose sticker, comprising:

a first substrate comprising a decorative element;

a first adhesive layer disposed on a first side of the first substrate;

a releasable second adhesive layer disposed on a second side of the first substrate;

a transparent second substrate, the transparent second substrate having a first side and a second side;

a third adhesive layer disposed on the second side of the transparent second substrate;

a first release layer in contact with the third adhesive layer;

a decorative cover comprising the first release layer and having a first side and a second side, and a decorative element visible from the second side, the first side releasably covering the third adhesive layer;

wherein the decorative cover is about the same size and shape of the second substrate, and entirely covers the second substrate, and wherein the decorative cover can be selectively removed to expose the third adhesive layer;

wherein the first side of the second substrate is in contact with the second adhesive layer of the first substrate, such that the multi-purpose sticker can be separated between the releasable second adhesive layer and the first substrate;

wherein the decorative element is visible through the transparent second substrate;

a third substrate, the third substrate having a first side and a second side; and a fourth adhesive layer disposed on the first side of the third substrate;

wherein the second side of the third substrate is in contact with the first adhesive layer of the first substrate, and wherein the first adhesive layer of the first substrate comprises a releasable adhesive, such that the multi-purpose sticker can be separated between the first adhesive layer and the first substrate.

* * * * *